US011677081B2

(12) United States Patent
Ozawa et al.

(10) Patent No.: US 11,677,081 B2
(45) Date of Patent: Jun. 13, 2023

(54) MEMBRANE ELECTRODE ASSEMBLY AND POLYMER ELECTROLYTE FUEL CELL

(71) Applicant: TOPPAN PRINTING CO., LTD., Tokyo (JP)

(72) Inventors: Madoka Ozawa, Tokyo (JP); Hiroyuki Michi, Tokyo (JP); Yuki Igarashi, Tokyo (JP); Katsuyuki Kishi, Tokyo (JP)

(73) Assignee: TOPPAN PRINTING CO., LTD., Tokyo (JP)

( * ) Notice: Subject to any disclaimer, the term of this patent is extended or adjusted under 35 U.S.C. 154(b) by 231 days.

(21) Appl. No.: 17/030,663

(22) Filed: Sep. 24, 2020

(65) Prior Publication Data
US 2021/0013524 A1 Jan. 14, 2021

Related U.S. Application Data

(63) Continuation of application No. PCT/JP2019/014211, filed on Mar. 29, 2019.

(30) Foreign Application Priority Data

Mar. 30, 2018 (JP) .............................. JP2018-069985
Mar. 30, 2018 (JP) .............................. JP2018-069987

(51) Int. Cl.
*H01M 4/92* (2006.01)
*H01M 4/86* (2006.01)
(Continued)

(52) U.S. Cl.
CPC ......... *H01M 4/926* (2013.01); *H01M 4/8657* (2013.01); *H01M 8/1004* (2013.01); *H01M 2008/1095* (2013.01)

(58) Field of Classification Search
None
See application file for complete search history.

(56) References Cited

U.S. PATENT DOCUMENTS 6,309,772 B1 * 10/2001 Zuber .................. H01M 4/8882
429/525
2006/0093893 A1 5/2006 Matsuo et al.
(Continued)

FOREIGN PATENT DOCUMENTS

JP    H10-241703 A    9/1998
JP    H11-329452 A    11/1999
(Continued)

OTHER PUBLICATIONS

Office Action dated Jan. 8, 2019 for corresponding Japanese Patent Application No. 2018-217281.
(Continued)

*Primary Examiner* — Daniel S Gatewood
(74) *Attorney, Agent, or Firm* — Foley & Lardner LLP

(57) ABSTRACT

A membrane electrode assembly includes a polyelectrolyte membrane having a first surface and a second surface facing away from the first surface; a fuel-electrode-side electrocatalyst layer bonded to the first surface and containing a first catalytic material, a first electrically conductive carrier, and a first polyelectrolyte, the first electrically conductive carrier carrying the first catalytic material; and an oxygen-electrode-side electrocatalyst layer bonded to the second surface and containing a second catalytic material, a second electrically conductive carrier, a second polyelectrolyte, and a fibrous material, the second electrically conductive carrier carrying the second catalytic material. The membrane electrode assembly contains voids, the voids including pores each having a size in a range of 3 nm or more and 5.5 μm or less.

20 Claims, 8 Drawing Sheets

(51) Int. Cl.
*H01M 8/1004* (2016.01)
*H01M 8/10* (2016.01)

(56) References Cited

U.S. PATENT DOCUMENTS

2006/0204832 A1\* 9/2006 Mei ................... H01M 4/90
 429/506
2012/0171597 A1\* 7/2012 Fukazawa ............ H01M 8/1011
 977/948

FOREIGN PATENT DOCUMENTS

| JP | 2001-338651 A | 12/2001 |
| JP | 2005-310714 A | 11/2005 |
| JP | 2006-134630 A | 5/2006 |
| JP | 2006-253030 A | 9/2006 |
| JP | 2009-199935 A | 9/2009 |
| JP | 2009-238496 A | 10/2009 |
| JP | 2010-027360 A | 2/2010 |
| JP | 5537178 B2 | 7/2014 |
| JP | 2020-140908 A | 9/2020 |
| WO | WO-2011/013206 A1 | 2/2011 |

OTHER PUBLICATIONS

Supplementary European Search Report dated May 3, 2021 for corresponding European Patent Application No. 19774906.2.

International Searching Authority, "International Search Report," issued in connection with International Patent Application No. PCT/JP2019/014211, dated Jun. 18, 2019.

International Searching Authority, "Written Opinion," issued in connection with International Patent Application No. PCT/JP2019/014211, dated Jun. 18, 2019.

Japanese Office Action issued in connection with JP Appl. Ser. No. 2019-079759 dated Nov. 29, 2022 (6 pages).

\* cited by examiner

MEMBRANE ELECTRODE ASSEMBLY AND POLYMER ELECTROLYTE FUEL CELL

CROSS-REFERENCE TO RELATED PATENT APPLICATIONS

This application is a continuation application filed under 35 U.S.C. § 111(a) claiming the benefit under 35 U.S.C. §§ 120 and 365(c) of International Patent Application No. PCT/JP2019/014211, filed on Mar. 29, 2019, which is based upon and claims the benefit of priority to Japanese Patent Applications Nos. 2018-069985 and 2018-069987, both filed on Mar. 30, 2018, the disclosures of which are all incorporated herein by reference in their entireties.

TECHNICAL FIELD

The present invention relates to a membrane electrode assembly and a polymer electrolyte fuel cell.

BACKGROUND ART

Background

Fuel cells generate electrical currents by chemical reaction of hydrogen and oxygen. Fuel cells are drawing attention as clean energy sources having higher efficiency, lower environmental load, and lower noise than those of conventional power generation systems. In particular, polymer electrolyte fuel cells, which can be used at room temperature or thereabout, are regarded as promising for application to in-vehicle power sources, domestic stationary power sources, or the like.

In general, polymer electrolyte fuel cells have a structure in which several cell units are laminated together. A cell unit has a structure in which one membrane electrode assembly is sandwiched between two separators. The membrane electrode assembly includes a polyelectrolyte membrane, a fuel electrode (anode) that supplies fuel gas, and an oxygen electrode (cathode) that supplies an oxidant. The fuel electrode is bonded to a first surface of the polyelectrolyte membrane, and the oxygen electrode is bonded to a second surface facing away from the first surface. The separators each include a gas flow channel and a cooling-water flow channel. The fuel electrode and the oxygen electrode each include an electrocatalyst layer and a gas diffusion layer. In each electrode, the electrocatalyst layer is in contact with the polyelectrolyte membrane. The electrocatalyst layer contains a catalytic material, such as a platinum-based noble metal, an electrically conductive carrier, and a polyelectrolyte. The gas diffusion layer has gas permeability and electrical conductivity.

Such a polymer electrolyte fuel cell generates electrical current by electrochemical reaction as follows. First, in the electrocatalyst layer of the fuel electrode, hydrogen contained in the fuel gas is oxidized by the catalytic material to generate protons and electrons. The generated protons pass through the polyelectrolyte in the electrocatalyst layer and the polyelectrolyte membrane and reach the electrocatalyst layer of the oxygen electrode. The electrons generated together with the protons pass through the electrically conductive carrier in the electrocatalyst layer, the gas diffusion layer, the separator, and an external circuit and reach the electrocatalyst layer of the oxygen electrode. In the electrocatalyst layer of the oxygen electrode, the protons and electrons react with oxygen contained in the oxidant gas to produce water.

The gas diffusion layer diffuses the gas supplied from the separator and supplies the gas to the electrocatalyst layer. The electrocatalyst layer has pores for transporting multiple materials, such as gas and produced water. The pores of the fuel electrode are required to smoothly supply the fuel gas to a three-phase interface, which is a reaction field for redox reactions. The pores of the oxygen electrode are required to smoothly supply the oxidant gas to the electrocatalyst layer. To smoothly supply the fuel gas or oxygen gas, or further, to enhance the power generation performance of the fuel cell, intervals are required to be provided between the pores of the electrocatalyst layer to minimize regions of high pore density. As a configuration for minimizing regions of high pore density, for example, electrocatalyst layers containing carbon particles or carbon fibers have been proposed (e.g., refer to PTLs 1 and 2).

[Citation List] [Patent Literature] [PTL 1] JP H10-241703 A; [PTL 2] JP 5537178 B2.

SUMMARY OF THE INVENTION

Technical Problem

In PTL 1, carbon particles having different sizes are combined with each other to minimize regions of high pore density in the electrocatalyst layer. In PTL 2, carbon fibers having different lengths are combined with each other to minimize regions of high pore density in the electrocatalyst layer. Even if the combination of the carbon particles is the same between layers, the size and distribution of the pores may be different between the layers, depending on the composition, the formation conditions, and the like of the layers. Similarly, even if the combination of the carbon fibers is the same between layers, the size and distribution of the pores may be different between the layers. Power generation performances of fuel cells greatly depend on the size and distribution of pores. Therefore, from the perspective of enhancing power generation performance, there is still room for improving the method in which combinations of carbon particles or carbon fibers are used.

The present invention aims to provide a membrane electrode assembly that can enhance power generation performance, and a polymer electrolyte fuel cell.

Solution to Problem

A membrane electrode assembly for solving the above issues is being used for a polymer electrolyte fuel cell. The membrane electrode assembly includes a polyelectrolyte membrane having a first surface and a second surface facing away from the first surface; a fuel-electrode-side electrocatalyst layer bonded to the first surface and containing a first catalytic material, a first electrically conductive carrier, and a first polyelectrolyte, the first electrically conductive carrier carrying the first catalytic material; and an oxygen-electrode-side electrocatalyst layer bonded to the second surface and containing a second catalytic material, a second electrically conductive carrier, a second polyelectrolyte, and a fibrous material, the second electrically conductive carrier carrying the second catalytic material. The membrane electrode assembly contains voids, the voids including pores each having a size in the range of 3 nm or more and 5.5 µm or less. A distribution curve indicating distribution of pore volume with respect to pore size has a peak at which the pore size is in the range of 0.06 µm or more and 0.11 µm or less. The pore volume is a total volume of pores having a specific pore size among the pores and is measured by mercury intrusion porosimetry. The pore size is a pore diameter calculated from the pore volume.

A membrane electrode assembly for solving the above issues is being used for a polymer electrolyte fuel cell. The membrane electrode assembly includes a polyelectrolyte membrane having a first surface and a second surface facing away from the first surface; a fuel-electrode-side electrocatalyst layer bonded to the first surface and containing a first catalytic material, a first electrically conductive carrier, and a first polyelectrolyte, the first electrically conductive carrier carrying the first catalytic material; and an oxygen-electrode-side electrocatalyst layer bonded to the second surface and containing a second catalytic material, a second electrically conductive carrier, a second polyelectrolyte, and a fibrous material, the second electrically conductive carrier carrying the second catalytic material. The membrane electrode assembly contains voids, the voids including pores each having a size in the range of 3 nm or more and 5.5 µm or less. The pore size is a pore diameter calculated from a pore volume measured by mercury intrusion porosimetry. An integrated value of the pore volumes of the pores in the entire range of the pore size is a first integrated volume. An integrated value of the pore volumes of the pores having a pore size of 50 nm or less is a second integrated volume. A percentage of the second integrated volume to the first integrated volume is in the range of 25% or more and 45% or less.

A membrane electrode assembly for solving the above issues is being used for a polymer electrolyte fuel cell. The membrane electrode assembly includes a polyelectrolyte membrane having a first surface and a second surface facing away from the first surface; a fuel-electrode-side electrocatalyst layer bonded to the first surface and containing a first catalytic material, a first electrically conductive carrier, and a first polyelectrolyte, the first electrically conductive carrier carrying the first catalytic material; and an oxygen-electrode-side electrocatalyst layer bonded to the second surface and containing a second catalytic material, a second electrically conductive carrier, a second polyelectrolyte, and a fibrous material, the second electrically conductive carrier carrying the second catalytic material. The membrane electrode assembly contains voids, the voids including pores each having a size in the range of 3 nm or more and 5.5 µm or less. The pore size is a pore diameter calculated from a pore volume measured by mercury intrusion porosimetry. An integrated value of the pore volumes of the pores having pore sizes in the entire range of the pore size is a first integrated volume. An integrated value of the pore volumes of the pores having a pore size of 100 nm or more is a third integrated volume. A percentage of the third integrated volume to the first integrated volume is in the range of 30% or more and 50% or less.

A membrane electrode assembly for solving the above issues is being used for a polymer electrolyte fuel cell. The membrane electrode assembly includes a polyelectrolyte membrane having a first surface and a second surface facing away from the first surface; a fuel-electrode-side electrocatalyst layer bonded to the first surface and containing a first catalytic material, a first electrically conductive carrier, and a first polyelectrolyte, the first electrically conductive carrier carrying the first catalytic material; and an oxygen-electrode-side electrocatalyst layer bonded to the second surface and containing a second catalytic material, a second electrically conductive carrier, a second polyelectrolyte, and a fibrous material, the second electrically conductive carrier carrying the second catalytic material. The membrane electrode assembly contains voids, the voids including pores each having a size in the range of 3 nm or more and 5.5 µm or less. The pore size is a pore diameter calculated from a pore volume measured by mercury intrusion porosimetry. For a distribution curve indicating distribution of pore volume with respect to pore size, an integrated value of the pore volumes of the pores having pore sizes in the entire range of the pore size is a first log differential integrated volume, an integrated value of the pore volumes of the pores having a pore size of 60 nm or less is a second log differential integrated volume, a percentage of the second log differential integrated volume to the first log differential integrated volume is in the range of 30% or more and 60% or less, an integrated value of the pore volumes of the pores having a pore size of 100 nm or more is a third log differential integrated volume, and a percentage of the third log differential integrated volume to the first log differential integrated volume is in the range of 30% or more and 60% or less.

A polymer electrolyte fuel cell for solving the above issue includes the above membrane electrode assembly.

DETAILED DESCRIPTION

Embodiments of the present invention of an optical film and an optical barrier film will be described below with reference to the drawings. In the following description of the drawings to be referred, components identical with or similar to each other are given the same or similar reference signs, unless there is a reason not to. It should be noted that the drawings are only schematically illustrated, and thus the relationship between thickness and two-dimensional size of the components, and the thickness ratio between the layers, are not to scale. Therefore, specific thicknesses and dimensions should be understood in view of the following description. As a matter of course, dimensional relationships or ratios may be different between the drawings.

Further, the embodiments described below are merely examples of configurations for embodying the technical idea of the present invention. The technical idea of the present invention does not limit the materials, shapes, structures, arrangements, and the like of the components to those described below. The technical idea of the present invention can be modified variously within the technical scope defined by the claims. The present invention is not limited to the following embodiments within the scope not departing from the spirit of the present invention.

[First Embodiment]

Referring to FIGS. 1 to 5, a first embodiment of an electrocatalyst layer, a membrane electrode assembly, and a polymer electrolyte fuel cell will be described. In the following, configurations of a membrane electrode assembly, an electrocatalyst layer, cell units configuring a polymer electrolyte fuel cell, a method of producing the membrane electrode assembly, and examples will be described in this order.

[Membrane Electrode Assembly]

Figure 1:
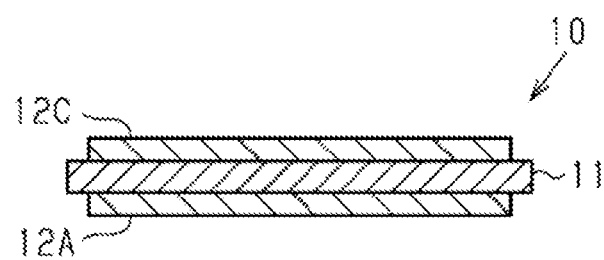
FIG. 1 is a cross-sectional diagram illustrating a structure of a membrane electrode assembly according to a first embodiment.

Referring to FIG. 1, a configuration of a membrane electrode assembly will be described. FIG. 1 shows a cross-sectional structure of a membrane electrode assembly in the thickness direction.

FIG. 1 shows a membrane electrode assembly 10 including a polyelectrolyte membrane 11, an oxygen-electrode-side electrocatalyst layer 12C, and fuel-electrode-side electrocatalyst layer 12A. The polyelectrolyte membrane 11 is a solid polyelectrolyte membrane. The polyelectrolyte membrane 11 has two surfaces facing away from each other, one being provided with the oxygen-electrode-side electrocatalyst layer 12C bonded thereto, and the other being provided with the fuel-electrode-side electrocatalyst layer 12A bonded thereto. In the polyelectrolyte membrane 11, the surface to which the fuel-electrode-side electrocatalyst layer is bonded is a first surface, and the surface to which the oxygen-electrode-side electrocatalyst layer is bonded is a second surface. The oxygen-electrode-side electrocatalyst layer 12C configures an oxygen electrode (cathode). The fuel-electrode-side electrocatalyst layer 12A configures a fuel electrode (anode). These electrocatalyst layers 12 may have peripheries sealed with gaskets or the like (not shown).

[Electrocatalyst Layer]

Figure 2:
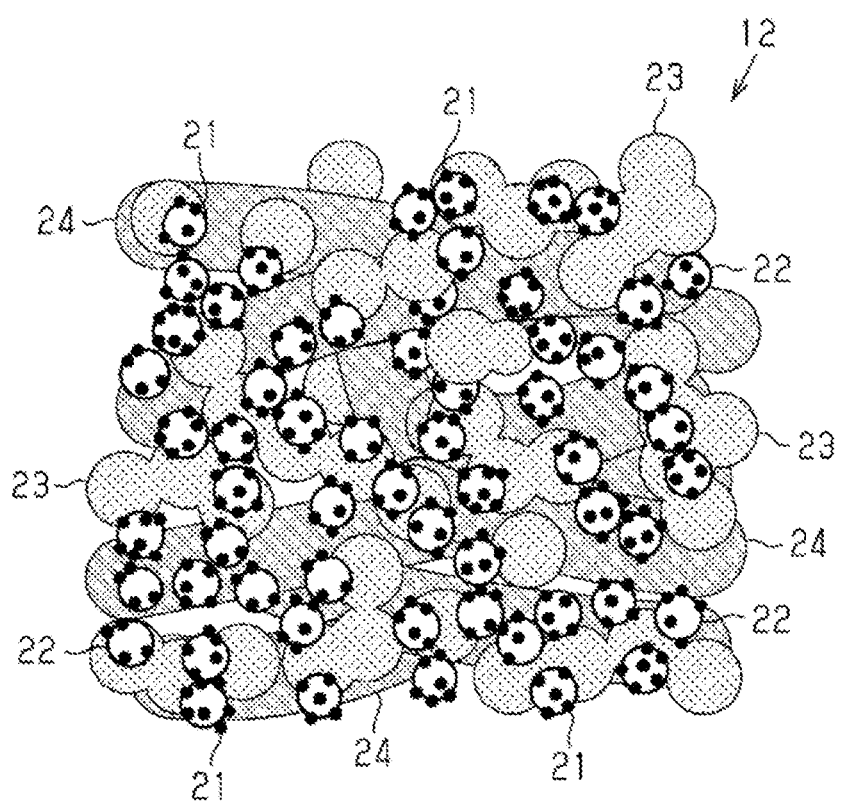
FIG. 2 is a schematic diagram illustrating a structure of an electrocatalyst layer of the membrane electrode assembly shown in FIG. 1.

Referring to FIG. 2, a configuration of an electrocatalyst layer of the membrane electrode assembly 10 will be described in more detail. The electrocatalyst layer described below has a configuration that is applied to both the oxygen- and fuel-electrode-side electrocatalyst layers 12C and 12A, but may be applied to either of the oxygen- and fuel-electrode-side electrocatalyst layers 12C and 12A.

As shown in FIG. 2, each electrocatalyst layer 12 contains a catalytic material 21, an electrically conductive carrier 22, a polyelectrolyte 23, and a fibrous material 24. The electrocatalyst layer 12 does not necessarily have to contain the fibrous material 24. In the electrocatalyst layer 12, the portions containing no catalytic material 21, electrically conductive carrier 22, polyelectrolyte 23 and fibrous material 24 are voids. In the present embodiment, voids having a diameter in the range of 3 nm or more and 5.5 μm or less, are defined to be pores.

In the electrocatalyst layer 12, the diameter of a pore which is calculated from a pore volume Vp measured by mercury intrusion porosimetry is a pore size D. It should be noted that the pore size D is defined to be a size D of a cylindrical model pore acquired by mercury intrusion porosimetry.

Distribution of the pore volume Vp mentioned above will be described. Distribution of the pore volume Vp is expressed as a distribution function of the pore volume Vp (=dVp/d log D) (log differential pore volume distribution) for pore size D (3 nm≤D≤5.5 μm). Distribution of the pore volume Vp is obtained by mercury intrusion porosimetry.

Since mercury has a high surface tension, a predetermined pressure P is required to be applied thereto for entry into pores. Distribution of the pore volume Vp or a specific surface area can be calculated from a pressure P applied to the mercury to enter the pores, and the amount of mercury injected into the pores. The relationship between the applied pressure P and the pore size D enabling mercury to enter therein with the pressure P can be expressed by Formula (1) which is known as Washburn's equation. In Formula (1) below, $\gamma$ is the surface tension of mercury, and $\theta$ is the contact angle between mercury and the wall surface of a pore. In the present embodiment, a pore size D is calculated assuming the surface tension $\gamma$ to be 0.48 N/m and the contact angle $\theta$ to be 130°.

$$D = -4\gamma \cos\theta/P \qquad (1)$$

It should be noted that, in actual measurements based on mercury intrusion porosimetry, the volume of injected mercury is recorded every time a different pressure P is applied. Then, each pressure P is converted to a pore size D based on Formula (1). Assuming that the volume of the injected mercury is equal to the pore volume Vp, a pore volume increase dV is plotted against the pore size D. The pore volume increase dV in this case is an increase of the pore volume Vp when the pore size has increased from D to D+dD. The peak of the plot is the peak of the distribution of the pore volume Vp.

Functions required for enhancing power generation performance in the electrocatalyst layer 12 are, for example, maintaining a three-phase interface in the electrocatalyst layer 12, diffusing gas in the electrocatalyst layer 12, and draining water produced in the electrocatalyst layer 12. The pore size D suitable for maintaining the three-phase interface, the pore size D suitable for diffusing gas, and the pore size D suitable for draining produced water do not have to be necessarily the same. The pore size D suitable for enhancing power generation performance needs to satisfy these pore sizes D. The three-phase interface refers to an interface formed by a polyelectrolyte, a catalyst and a gas.

From the perspectives set forth above, the electrocatalyst layer 12 is required to satisfy at least one of the following Conditions 1 to 4.

[Condition 1]

In Condition 1, the pore size D at the peak of the distribution curve indicating distribution of the pore volume Vp with respect to the pore size D is in the range of 0.06 μm or more and 0.1 μm or less (0.06 μm≤D≤0.1 μm). The pore size D at the peak of the distribution curve is preferred to be in the range of 0.07 μm or more and 0.1 μm or less (0.07 μm≤D≤0.1 μm). If the pore size D at the peak of the distribution curve is in the range of 0.06 μm or more and 0.1 μm or less, the electrocatalyst layer 12 may include voids for achieving sufficient gas diffusion and drainage.

[Condition 2]

In the electrocatalyst layer 12, a value obtained by integrating the pore volumes Vp of all the pores is a first integrated volume (ΣVp 1). A value obtained by integrating the pore volumes Vp of the pores having a pore size D of 50 nm or less is a second integrated volume (ΣVp 2). In Condition 2, the percentage (ΣVp 2/ΣVp 1×100) of the second integrated volume to the first integrated volume is in the range of 30% or more and 40% or less. Each integrated volume can be calculated by integrating the pore volumes Vp, in the range of the pore size D corresponding to the integrated volume.

[Condition 3]

In the electrocatalyst layer 12, the value obtained by integrating the pore volumes Vp of the pores having a pore size D of 90 nm or more is a third integrated volume (ΣVp 3). In Condition 3, the percentage (ΣVp 3/ΣVp 1×100) of the third integrated volume to the first integrated volume is in the range of 15% or more and 35% or less. The third integrated volume can be calculated by integrating the pore volumes Vp of the pores having a pore size D of 90 nm or more.

As in the case where Conditions 2 and 3 are satisfied, if the pores of the electrocatalyst layer 12 include pores having a relatively large size in the above ratio, the three-phase interface can be maintained in the electrocatalyst layer 12, and gas diffusion and drainage of the produced water can be enhanced in the electrocatalyst layer 12. If the pores of the electrocatalyst layer 12 include pores having a relatively small size in the above ratio, the three-phase interface can be maintained in the electrocatalyst layer 12, and gas diffusion and drainage of the produced water can be enhanced in the electrocatalyst layer 12.

[Condition 4]

The pore sizes in the range of 50 nm or more and 80 nm or less are a first pore size range. A value obtained by integrating the pore volumes Vp of the pores having a size between 3 nm and the first pore size range is a cumulative pore volume. The percentage of the cumulative pore volume to the first integrated volume is a cumulative pore volume ratio. In Condition 4, in the electrocatalyst layer 12, the gradient of the distribution curve indicating distribution of the cumulative pore volume with respect to the first pore size (μm) range is in the range of 7 or more and 14 or less. In the distribution curve, the first pore sizes are expressed by logarithmic values. In the electrocatalyst layer 12 satisfying Condition 4, pores having a relatively small size in the range of 3 nm or more and 80 nm or less are distributed at a ratio suitable for the functions required for enhancing power generation performance. Specifically, the three-phase interface can be maintained in the electrocatalyst layer 12, and gas diffusion and drainage of the produced water can be enhanced in the electrocatalyst layer 12.

The electrocatalyst layer 12 is preferred to satisfy the following Condition 5 in addition to Conditions 1 to 4.

[Condition 5]

In Condition 5, the percentage of an integrated volume V obtained by integrating the pore volumes of all the pores in the electrocatalyst layer 12 to a volume $V_0$ of the electrocatalyst layer 12 ($V/V_0 \times 100(\%)$) is in the range of 65% or more and 90% or less. This allows the electrocatalyst layer 12 to provide better gas diffusion and drainage. The volume $V_0$ of the electrocatalyst layer 12 can be obtained as a product of the area and thickness of the electrocatalyst layer 12 used in the measurements used for mercury intrusion porosimetry.

The electrocatalyst layer 12 is preferred to have a thickness in the range of 5 μm or more and 30 μm or less. If the thickness of the electrocatalyst layer 12 is 30 μm or less, the occurrence of cracking may be minimized. Also, use of the electrocatalyst layer 12 for a polymer electrolyte fuel cell may prevent diffusion of the gas or produced water and electrical conductivity from being impaired, and further, may prevent the output of the polymer electrolyte fuel cell from being lowered. If the thickness of the electrocatalyst layer 12 is 5 μm or more, the thickness of the electrocatalyst layer 12 may be less likely to vary, and the catalytic material 21 or the polyelectrolyte 23 may be prevented from being non-uniformly distributed in the electrocatalyst layer 12. Cracking on the surfaces of the electrocatalyst layer 12 or uneven thickness of the electrocatalyst layer 12 is unfavorable because they are very likely to adversely affect durability of the polymer electrolyte fuel cell when the electrocatalyst layer 12 is used as part thereof and when the polymer electrolyte fuel cell is operated for a long period of time.

The thickness of the electrocatalyst layer 12 can be measured, for example, by observing a cross section of the electrocatalyst layer 12 using a scanning electron microscope (SEM). A cross section of the electrocatalyst layer 12 can be exposed by using such a method as ion milling or using an ultramicrotome. When exposing a cross section of the electrocatalyst layer 12, the electrocatalyst layer 12 may preferably be cooled. This may reduce damage to the polyelectrolyte 23 contained in the electrocatalyst layer 12.

[Configuration of Polymer Electrolyte Fuel Cell]

Figure 3:
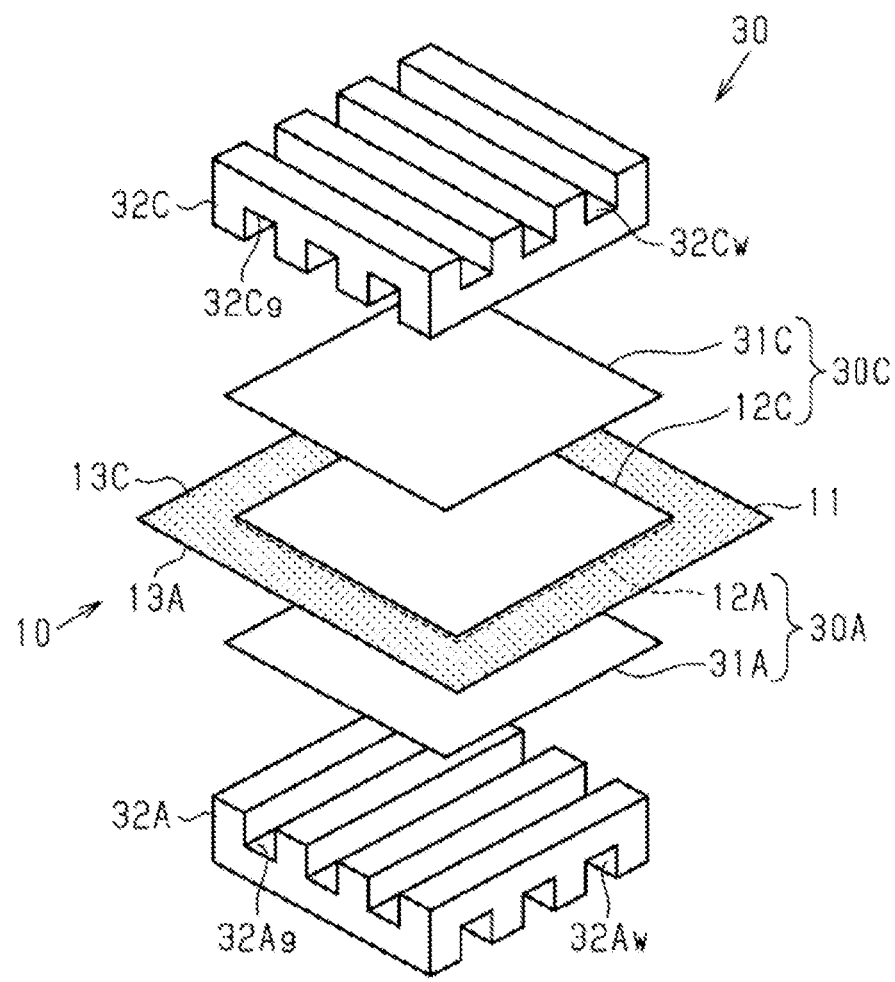
FIG. 3 is an exploded perspective diagram illustrating a configuration of a polymer electrolyte fuel cell including the membrane electrode assembly shown in FIG. 1.

Referring to FIG. 3, a configuration of a polymer electrolyte fuel cell including the membrane electrode assembly 10 will be described. The configuration described below is only an example of a polymer electrolyte fuel cell. FIG. 3 shows a configuration of a cell unit included in a polymer electrolyte fuel cell. The polymer electrolyte fuel cell may include a plurality of cell units, which may be laminated together.

FIG. 3 shows a polymer electrolyte fuel cell 30 including a membrane electrode assembly 10, two gas diffusion layers, and two separators. The two gas diffusion layers are an oxygen-electrode-side gas diffusion layer 31C and a fuel-electrode-side gas diffusion layer 31A. The two separators are an oxygen-electrode-side separator 32C and a fuel-electrode-side separator 32A.

The oxygen-electrode-side gas diffusion layer 31C is in contract with an oxygen-electrode-side electrocatalyst layer 12C. The oxygen-electrode-side electrocatalyst layer 12C and the oxygen-electrode-side gas diffusion layer 31C form an oxygen electrode (cathode) 30C. The fuel-electrode-side gas diffusion layer 31A is in contract with a fuel-electrode-side electrocatalyst layer 12A. The fuel-electrode-side electrocatalyst layer 12A and the fuel-electrode-side gas diffusion layer 31A form a fuel electrode (anode) 30A.

Of the surfaces of a polyelectrolyte membrane 11, the surface to which the oxygen-electrode-side electrocatalyst layer 12C is bonded is an oxygen electrode surface, and the surface to which the fuel-electrode-side electrocatalyst layer 12A is bonded is a fuel electrode surface. Of the oxygen electrode surface, the portion that is not covered with the oxygen-electrode-side electrocatalyst layer 12C is a peripheral portion. The peripheral portion is provided thereon with an oxygen-electrode-side gasket 13C. Of the fuel electrode surface, the portion that is not covered with the fuel-electrode-side electrocatalyst layer 12A is a peripheral portion. The peripheral portion is provided thereon with a fuel-electrode-side gasket 13A. The gaskets 13C and 13A minimize leakage of gas from the peripheral portions of the respective surfaces.

The oxygen-electrode-side separator 32C and the fuel-electrode-side separator 32A sandwich a multi-layered body formed of the membrane electrode assembly 10 and the two gas diffusion layers 31C and 31A in the thickness direction of the polymer electrolyte fuel cell 30. The oxygen-electrode-side separator 32C faces the oxygen-electrode-side gas diffusion layer 31C. The fuel-electrode-side separator 32A faces the fuel-electrode-side gas diffusion layer 31A.

The oxygen-electrode-side separator 32C has two opposing surfaces each provided with multiple grooves. Of these two surfaces, the surface facing the oxygen-electrode-side gas diffusion layer 31C has grooves serving as gas flow channels 32Cg. Of these two surfaces, the surface facing away from the surface provided with the gas flow channels 32Cg has grooves serving as cooling-water flow channels 32Cw.

The fuel-electrode-side separator 32A has two opposing surfaces each provided with multiple grooves. Of the two surfaces, the surface facing the fuel-electrode-side gas diffusion layer 31A has grooves serving as gas flow channels 32Ag. Of the two surfaces, the surface facing away from the surface provided with the gas flow channels 32Ag has grooves serving as cooling-water flow channels 32Aw.

The separators 32C and 32A are each made of an electrically conductive material not allowing gas to permeate therein.

In the polymer electrolyte fuel cell 30, an oxidant is supplied to the oxygen electrode 30C through the gas flow channel 32Cg of the oxygen-electrode-side separator 32C. In the polymer electrolyte fuel cell 30, fuel is supplied to the fuel electrode 30A through the gas flow channels 32Ag of the fuel-electrode-side separator 32A. Being configured in this way, the polymer electrolyte fuel cell 30 generates electrical power. The oxidant may be, for example, air, oxygen, or the like. The fuel may be, for example, a hydrogen-containing fuel gas, an organic fuel, or the like.

In the polymer electrolyte fuel cell 30, a reaction expressed by the following Reaction Formula (1) occurs at the fuel electrode 30A. Also, a reaction expressed by the following Reaction Formula (2) occurs at the oxygen electrode 30C.

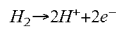

$H_2 \rightarrow 2H^+ + 2e^-$      Reaction Formula (1)

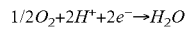

$1/2 O_2 + 2H^+ + 2e^- \rightarrow H_2O$      Reaction Formula (2)

In this way, the polymer electrolyte fuel cell 30 of the present embodiment produces water at the oxygen electrode 30C with the oxygen-containing gas being supplied to the oxygen electrode 30C.

As described above, the electrocatalyst layer 12 of the present embodiment can be applied to the fuel-electrode-side electrocatalyst layer 12A, or can be applied to the oxygen-electrode-side electrocatalyst layer 12C. As indicated in the above Reaction Formula (2), water is produced from oxygen, protons, and electrons at the oxygen electrode 30C. If the water produced at the oxygen electrode 30C is not drained from the oxygen electrode 30C, supply of the oxygen-containing gas to the oxygen electrode 30C may be prevented by the water. This may impair power generation performance of the polymer electrolyte fuel cell 30. In this regard, the electrocatalyst layer 12 of the present embodiment has high drainage performance by satisfying the conditions described above. Therefore, application of such an electrocatalyst layer 12 to the oxygen-electrode-side electrocatalyst layer 12C of the oxygen electrode 30C can achieve an improved effect of enhancing power generation performance of the polymer electrolyte fuel cell 30.

[Method of Producing Membrane Electrode Assembly]

A method of producing the above membrane electrode assembly will be described.

When producing a membrane electrode assembly 10, the catalytic material 21, the electrically conductive carrier 22, the polyelectrolyte 23, and the fibrous material 24 are mixed in a dispersion medium, and then the mixture is subjected to dispersion processing to prepare a catalyst ink. The fibrous material 24 may be omitted from the materials of the catalyst ink. The dispersion processing may be performed by using a planetary ball mill, a bead mill, an ultrasonic homogenizer, or the like.

The dispersion medium of the catalyst ink may be a solvent that does not erode the catalytic material 21, the electrically conductive carrier 22, the polyelectrolyte 23, and the fibrous material 24, and can dissolve the polyelectrolyte 23 in a state where the dispersion medium is highly fluid. Alternatively, the dispersion medium may be a solvent that disperses the polyelectrolyte 23 as a fine gel. The dispersion medium may contain water, which is compatible with the polyelectrolyte 23. The catalyst ink is preferred to contain a volatile liquid organic solvent. If the solvent is a lower alcohol, there is a risk of ignition. Therefore, it is preferred that water be mixed with such a solvent. The solvent can be mixed with water in an amount that does not cause cloudiness or gelatinization of the catalyst ink due to separation of the polyelectrolyte 23.

The prepared catalyst ink is applied to a substrate and then dried to remove the solvent from the catalyst ink coating film. Thus, an electrocatalyst layer 12 is formed on the substrate. The substrate may be a polyelectrolyte membrane 11 or a transfer substrate. When a polyelectrolyte membrane 11 is used as the substrate, for example, a method may be used in which an electrocatalyst layer 12 is formed by applying the catalyst ink directly on a surface of the polyelectrolyte membrane 11 and then removing the solvent from the catalyst ink coating film.

When a transfer substrate is used, a substrate having a catalytic layer may be prepared by applying the catalyst ink on the transfer substrate and then drying the catalyst ink. Subsequently, for example, the substrate having a catalytic layer may be heated and pressed in a state where the surface of the electrocatalyst layer 12 is in contact with the polyelectrolyte membrane 11 to bond the electrocatalyst layer 12 thereto. Electrocatalyst layers 12 may be respectively bonded to the two surfaces of the polyelectrolyte membrane 11 to prepare a membrane electrode assembly 10.

Various coating methods can be used to apply the catalyst ink to the substrate. Examples of the coating methods include die coating, roll coating, curtain coating, spray coating, and using a squeegee.

Die coating may be preferably used as a coating method. Die coating is preferable because the coating thickness is stable in the middle of the coating period and the catalytic ink can be intermittently applied. The method of drying the catalyst ink coating film may be, for example, drying using a hot air oven, IR (infrared) rays, or a hot plate, or may be vacuum drying, or the like. The drying temperature is preferred to be in the range of 40° C. or more and 200° C. or less, and more preferred to be 40° C. or more and 120° C. or less. The drying time is preferred to be in the range of 0.5 minutes or more and 1 hour or less, and more preferred to be 1 minute or more and 30 minutes or less.

If the electrocatalyst layer 12 is formed on a transfer substrate, the pressure and the temperature during the transfer of the electrocatalyst layer 12 may affect power generation performance of the membrane electrode assembly 10.

To obtain a membrane electrode assembly having high power generation performance, the pressure applied to the multilayer is preferred to be in the range of 0.1 MPa or more and 20 MPa or less. If the pressure is 20 MPa or less, the electrocatalyst layer 12 can be prevented from being excessively pressed. If the pressure is 0.1 MPa or more, power generation performance may be prevented from being impaired, which would otherwise have been impaired due to the bonding being lowered between the electrocatalyst layer 12 and the polyelectrolyte membrane 11. The temperature at the time of bonding is preferred to be in the vicinity of the glass transition point of the polyelectrolyte membrane 11 or of the polyelectrolyte 23 contained in the electrocatalyst layer 12, from the perspectives of enhancing bonding at the interface between the polyelectrolyte membrane 11 and the electrocatalyst layer 12 and minimizing interfacial resistance.

The transfer substrate may be, for example, a polymer film, or a sheet made of a fluororesin. Fluororesins have good transferability. Examples of fluororesins include ethylene-tetrafluoroethylene copolymer (ETFE), tetrafluoroethylene-hexafluoropropylene copolymer (FEP), tetrafluoroperfluoroalkyl-vinyl ether copolymer (PFA) and polytetrafluoroethylene (PTFE). Examples of polymers forming the polymer film include polyimides, polyethylene terephthalate, polyamides (nylon (trademark)), polysulfones, polyethersulfones, polyphenylene sulfides, polyetheretherketones, polyetherimides, polyarylate and polyethylene naphthalates. The transfer substrate may be a gas diffusion layer.

The size and distribution of the pores of the electrocatalyst layers 12 can be controlled by controlling the temperature of heating the catalyst ink coating film, the rate of heating the coating film, the pressing conditions under which the catalyst ink is dried, the mixing ratio of the fibrous material 24, the solvent composition of the catalyst ink, the dispersion strength when controlling the catalyst ink, and the like. For example, as the mixing ratio of the fibrous material 24 is increased, the pore size D corresponding to the peak of the distribution curve is increased, the ratio of the second integrated volume to the first integrated volume is decreased, and the ratio of the third integrated volume to the first integrated volume is increased.

The catalytic material 21 may be, for example, metals of the platinum group, and metals other than the platinum group, or alloys, oxides, complex oxides and carbides of these metals, or the like. The metals of the platinum group are platinum, palladium, ruthenium, iridium, rhodium and osmium. The metals other than the platinum group include iron, lead, copper, chromium, cobalt, nickel, manganese, vanadium, molybdenum, gallium and aluminum.

As the electrically conductive carrier 22, a carrier that is electrically conductive and able to support the catalytic material 21 without being eroded by the catalytic material 21 may be used. The electrically conductive carrier 22 may be carbon particles. As the carbon particles, for example, carbon black, graphite, black lead, activated carbon, carbon nanotubes, carbon nanofibers, fullerene, or the like may be used. The size of the carbon particles is preferred to be in the range of 10 nm or more and 1,000 nm or less, and more preferred to be 10 nm or more and 100 nm or less. If the particle size is 10 nm or more, the carbon particles are less likely to be excessively dense in the electrocatalyst layer 12, and thereby gas diffusion in the electrocatalyst layer 12 is less likely to be impaired. If the particle size is 1,000 nm or less, cracking is less likely to occur in the electrocatalyst layer 12.

The polyelectrolyte contained in the polyelectrolyte membrane 11 and the electrocatalyst layers 12 may be a proton-conducting electrolyte. The polyelectrolyte may be, for example, a fluorinated polyelectrolyte or a hydrocarbon polyelectrolyte. The fluorinated polyelectrolyte may be a polyelectrolyte having a tetrafluoroethylene skeleton. A specific example of the polyelectrolyte having a tetrafluoroethylene skeleton may be Nafion (trademark) manufactured by DuPont. Examples of the hydrocarbon polyelectrolyte that can be used include sulfonated polyether ketones, sulfonated polyether sulfones, sulfonated polyether ether sulfones, sulfonated polysulfides and sulfonated polyphenylenes.

The polyelectrolyte contained in the polyelectrolyte membrane 11 and the polyelectrolyte 23 contained in the electrocatalyst layer 12 may be the same or may be different from each other. However, it is preferred that the polyelectrolyte in the polyelectrolyte membrane 11 and the polyelectrolyte 23 in the electrocatalyst layer 12 be the same or similar to each other, from the perspective of the interfacial resistance at the interface between the polyelectrolyte membrane 11 and the electrocatalyst layer 12, or the dimensional change ratio between the polyelectrolyte membrane 11 and the electrocatalyst layer 12 when the humidity varies.

The fibrous material 24 may be electron-conducting or proton-conducting fibers. Examples of electron-conducting fibers include carbon fibers, carbon nanotubes, carbon nanohorns and electrically conductive polymer nanofibers. From the perspective of electrical conductivity and dispersion, it is preferred that carbon nanofibers be used as the fibrous material 24.

Catalytic electron-conducting fibers are more preferred from the perspective of reducing the amount of use of catalyst made of noble metal. If the electrocatalyst layer 12 is used as an oxygen-electrode-side electrocatalyst layer forming the oxygen electrode, the catalytic electron-conducting fibers may be a carbon alloy catalyst prepared from carbon nanofibers. The catalytic electron-conducting fibers may be fibers formed from an electrode active material for fuel electrodes. The electrode active material may be a material containing at least one transition metal element selected from the group consisting of Ta, Nb, Ti and Zr. The material containing a transition metal element may be a partial oxide of a carbonitride of a transition metal element, or an electrically conductive oxide of a transition metal element, or an electrically conductive oxynitride of a transition metal element.

The proton-conducting fibers may be fibers formed from a proton-conducting polyelectrolyte. The material for forming a proton-conducting polyelectrolyte may be a fluorinated polyelectrolyte, a hydrocarbon polyelectrolyte, or the like. The fluorinated polyelectrolyte may be, for example, Nafion (trademark) manufactured by DuPont, Flemion (trademark) manufactured by Asahi Glass Co., Ltd, Aciplex (trademark) manufactured by Asahi Glass Co., Ltd, Gore Select (trademark) manufactured by Gore, or the like. The hydrocarbon polyelectrolyte may be sulfonated polyether ketones, sulfonated polyether sulfones, sulfonated polyether ether sulfones, sulfonated polysulfides, sulfonated polyphenylenes, sulfonated polyimides, or electrolytes such as acid-doped polybenzoxazoles.

For the fibrous material 24, types of the above-mentioned fibers may be used singly or in combination of two or more. The fibrous material 24 may be a combination of a type of electron-conducting fiber and a type of proton-conducting fiber. Of the fibers mentioned above, the fibrous material 24 may preferably include at least one selected from the group consisting of carbon nanofibers, carbon nanotubes, and electrolyte fibers.

The fibrous material 24 is preferred to have a fiber diameter in the range of 0.5 nm or more and 500 nm or less, and more preferred to be 5 nm or more and 200 nm or less. If the fiber diameter is in the range of 0.5 nm or more and 500 nm or less, the voids in the electrocatalyst layer 12 can be increased, and further, the output of the polymer electrolyte fuel cell 30 can be increased. The fibrous material 24 is preferred to have a fiber length in the range of 1 μm or more and 50 μm or less, and more preferred to be 1 μm or more and 20 μm or less. If the fiber length is in the range of 1 μm or more and 50 μm or less, the strength of the electrocatalyst layer 12 can be increased, and further, the occurrence of cracking is minimized in the electrocatalyst layer 12 when it is formed. Moreover, the voids in the electrocatalyst layer 12 can be increased, and further, the output of the polymer electrolyte fuel cell 30 can be increased.

EXAMPLES

Figure 4:
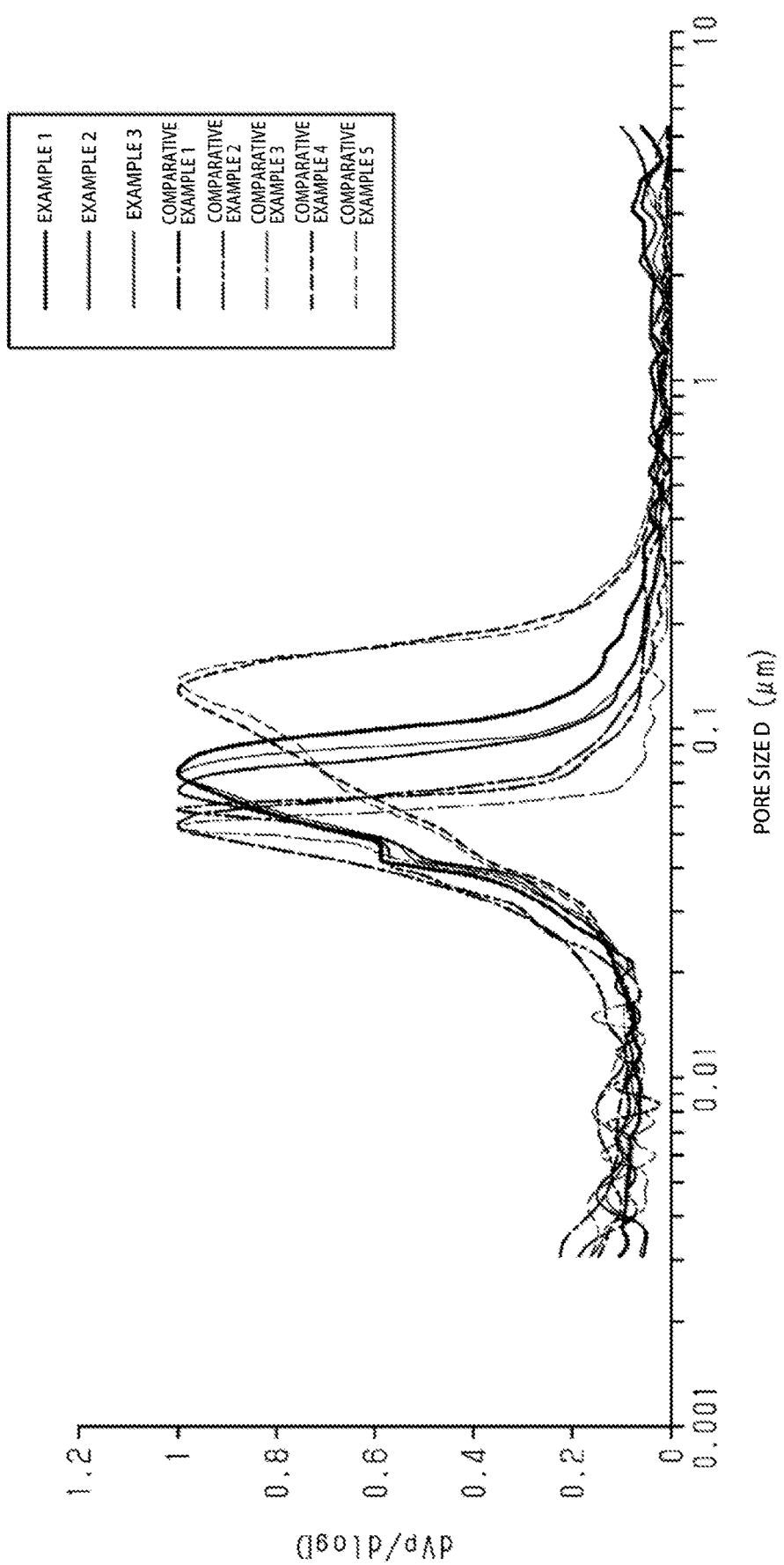
FIG. 4 is a graph illustrating distribution curves for pore size according to examples and comparative examples.
Figure 5:
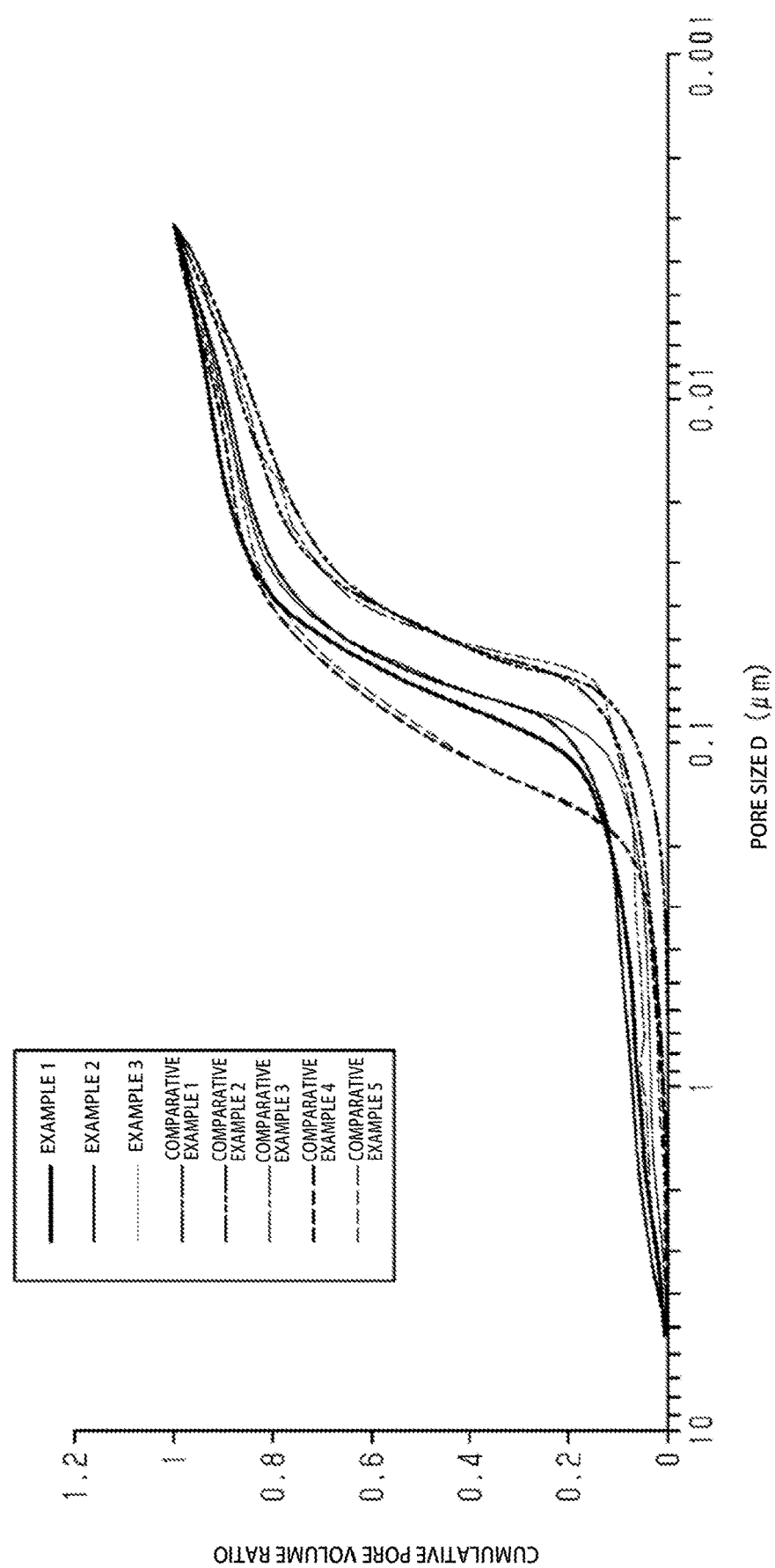
FIG. 5 is a graph illustrating relationships between pore size and cumulative pore volume ratio according to examples and comparative examples.

Referring to FIGS. 4 and 5, examples of the membrane electrode assembly will be described.

Example 1

Platinum on carbon catalyst (TEC10E50E manufactured by Tanaka Kikinzoku Kogyo Co., Ltd.), water, 1-propanol, polyelectrolyte (Nafion (trademark) dispersion manufactured by Wako Pure Chemical Industries, Ltd.), and carbon nanofibers (VGCF (trademark)-H manufactured by Showa Denko K.K.) were mixed. In the platinum on carbon catalyst, a platinum catalyst is supported on carbon particles. The ratio of the mass of the carbon particles to the mass of the polyelectrolyte was 1:1. The mixture was then subjected to dispersion processing using a planetary ball mill at 300 rpm for 60 minutes. In this case, zirconia balls having a diameter of 5 mm were added to about one third of the zirconia container. A catalyst ink was thereby prepared. The catalyst ink was prepared so that the mass of the polyelectrolyte was 100 mass % relative to the mass of the carbon particles, the mass of the fibrous material was 100 mass % relative to the mass of the carbon particles, the proportion of water in the dispersion medium was 50 mass %, and the solid content of the catalyst ink was 10 mass %.

The catalyst ink was applied to both surfaces of a polyelectrolyte membrane (Nafion (trademark) 211 manufactured by Dupont) by using a slit die coater to form a coating film. In this case, the catalyst ink was applied to the polyelectrolyte membrane so as to have a thickness of 150 μm on the cathode surface, and a thickness of 100 μm on the anode surface. The polyelectrolyte membrane provided with the coating films was then placed in a hot air oven heated to 80° C. and dried until the tackiness of the coating films disappeared. In this way, a membrane electrode assembly of Example 1 was obtained.

Example 2

A membrane electrode assembly of Example 2 was obtained as in Example 1, except that multiwall carbon nanotubes (60 nm to 100 nm in diameter manufactured by Tokyo Chemical Industry Co., Ltd.) were used in place of carbon nanofibers (VGCF (trademark)-H manufactured by Showa Denko K.K.) when preparing the catalyst ink.

Example 3

A catalyst ink was prepared as in Example 1. The catalyst ink was applied to a surface of a PTFE film by using a slit die coater to form a coating film. The PTFE film was then placed in a hot air oven heated to 80° C. and dried until the tackiness of the coating film disappeared. In this way, a substrate having a catalyst layer was obtained. A substrate having an oxygen-electrode-side electrocatalyst layer and a substrate having a fuel-electrode-side electrocatalyst layer were prepared. In this case, the catalyst ink was applied to the polyelectrolyte membrane so as to have a thickness of 150 μm on the cathode surface, and a thickness of 60 μm on the anode surface. The substrates each having a catalyst layer were respectively disposed on the two surfaces of a polyelectrolyte membrane (Nafion (trademark) 211 manufactured by Dupont) to form a laminate. The laminate was hot-pressed at 120° C. and 5 MPa to bond the two electrocatalyst layers to the polyelectrolyte membrane. Then, the PTFE films were separated from the respective electrocatalyst layers to obtain a membrane electrode assembly of Example 3.

Comparative Example 1

A membrane electrode assembly of Comparative Example 1 was obtained as in Example 1, except that the application amount of the catalyst ink was 3 times of that of Example 1 when forming an oxygen-electrode-side electrocatalyst layer.

Comparative Example 2

A membrane electrode assembly of Comparative Example 2 was obtained as in Example 1, except that the solid ratio was ½ of that of Example 1 when preparing the catalyst ink.

Comparative Example 3

A membrane electrode assembly of Comparative Example 3 was obtained as in Example 1, except that no carbon nanofibers were added when preparing the catalyst ink.

Comparative Example 4

A membrane electrode assembly of Comparative Example 4 was obtained as in Example 1, except that the amount of carbon nanofibers was 2 times of that of Example 1 when preparing the catalyst ink.

Comparative Example 5

A membrane electrode assembly of Comparative Example 5 was obtained as in Example 1, except that the amount of carbon nanofibers was 3 times of that of Example 1 when preparing the catalyst ink.

[Calculation Based on Pore Volume Vp]

Distribution of the pore volume Vp was measured by mercury intrusion porosimetry. Specifically, the pore volume Vp was measured by using an automated porosimeter (Autopore IV9510 manufactured by Micromeritics) for a membrane electrode assembly in which only an oxygenelectrode-side electrocatalyst layer was formed on a polyelectrolyte membrane. The measured cell had a volume of approximately 5 cm$^3$, and the pressure of mercury injection was increased stepwise from 3 kPa to 400 MPa. In this way, the injection amount of mercury, or pore volume Vp, at each pressure was obtained. Each pressure of mercury injection was converted to a pore size D by using Washburn's equation, and the pore volume Vp with respect to the pore size D was plotted as a distribution function dVp/d log D. The surface tension γ was taken to be 0.48 N/m, and the contact angle θ was taken to be 130°. The pore size D corresponding to the peak of the plot was read out as a pore size Dp.

Then, the volumes of all the pores having a pore size D in the range of 3 nm or more and 5.5 μm or less, were integrated to calculate a first integrated volume. Also, the volumes of the pores having a pore size D of 90 nm or more were integrated to calculate a third integrated volume. The third integrated volume was divided by the first integrated volume, and the quotient was multiplied by 100 to calculate a percentage R(L) of the third integrated volume to the first integrated volume. The pore volumes of the pores having a pore size D of 50 nm or less were integrated to calculate a second integrated volume. The second integrated volume was divided by the first integrated volume, and the quotient was multiplied by 100 to calculate a percentage R(S) of the second integrated volume to the first integrated volume. Furthermore, the area and thickness of the electrocatalyst layer used for measuring the pore volumes V were multiplied together to calculate a volume $V_0$ of the electrocatalyst layer. Then, a percentage $V/V_0$ of the first integrated volume V to the volume $V_0$ of the electrocatalyst layer was calculated.

[Measurements of Thickness of Electrocatalyst Layer]

A cross section of the electrocatalyst layer was observed by using a scanning electron microscope (SEM) to measure the thickness of the electrocatalyst layer. Specifically, a cross section of the electrocatalyst layer was observed at 1,000 times magnification by using a scanning electron microscope (FE-SEM S-4800 manufactured by Hitachi High-Technologies, Ltd., currently Hitachi High-Tech Corporation). The thickness of the electrocatalyst layer was measured at 30 observation points of the cross section. The average of the thicknesses at the 30 observation points was defined to be the thickness of the electrocatalyst layer.

[Measurements of Power Generation Performance]

Power generation performance was measured by using a method according to a booklet titled "Cell unit evaluation and analysis protocol" and published by the New Energy and Industrial Technology Development Organization (NEDO). A JARI standard cell was used as a cell unit for evaluation. In the JARI standard cell, a gas diffusion layer, a gasket, and a separator were disposed on each surface of a membrane electrode assembly and pressed against the surface to achieve a predetermined surface pressure. Then, IV measurements were performed according to the method described in the booklet "Cell unit evaluation and analysis protocol". These conditions were defined to be standard conditions. Also, IV measurements were performed with the relative humidities of the anode and cathode both being set to RH 100%. These conditions were defined to be high humidity conditions.

[Measurements of Durability]

For measuring durability, the same cell unit as in the measurements of power generation performance was used as a cell unit for evaluation. Durability was measured by conducting the humidity cycle test described in the booklet "Cell unit evaluation and analysis protocol" mentioned above.

[Comparisons]

Table 1 shows results on the following items for the electrocatalyst layers of the membrane electrode assemblies of Examples 1 to 3 and Comparative Examples 1 to 5. Specifically, Table 1 shows pore size Dp at the peak of the distribution curve of the pore volume Vp, percentage R(L) (%) of the third integrated volume to the first integrated volume, and percentage R(S) (%) of the second integrated volume to the first integrated volume, for the electrocatalyst layers. Table 1 shows percentage $V/V_0$ (%) of the first integrated volume V to the volume $V_0$ of the electrocatalyst layer, and thickness T (μm) of electrocatalyst layer, for the electrocatalyst layers. Also, Table 1 shows measurements of power generation performance and durability for the polymer electrolyte fuel cells respectively including membrane electrode assemblies of Examples 1 to 3 and Comparative Examples 1 to 5.

For power generation performance under the standard conditions, cell units having a current of 25 A or more at a voltage of 0.6 V were evaluated as good, and cell units having a current of less than 25 A at a voltage of 0.6 V were evaluated as poor. Under the high humidity conditions, cell units having a current of 30 A or more at a voltage of 0.6V were evaluated as good, and cell units having a current of less than 30 A at a voltage of 0.6 V were evaluated as poor. For durability, cell units having a hydrogen cross leak current of less than 10 times of the initial value after the lapse of 8,000 cycles were evaluated as good, and cell units having a hydrogen cross leak current of 10 times or more of the initial value after the lapse of 8,000 cycles were evaluated as poor.

FIG. 4 shows distribution curves of the pore volume Vp for the electrocatalyst layers of Examples 1 to 3 and Comparative Examples 1 to 5. FIG. 5 shows a graph indicating relationships between cumulative pore volume ratio and pore size D, for the electrocatalyst layers of Examples 1 to 3 and Comparative Examples 1 to 5.

TABLE 1

|  | DP (μm) | R(L) (%) | R(S) (%) | $V/V_0$ (%) | T (μm) | Power generation performance | | Durability |
|---|---|---|---|---|---|---|---|---|
|  |  |  |  |  |  | Standard conditions | High humidity conditions |  |
| Example 1 | 0.074 | 33 | 31 | 85 | 15 | Good | Good | Good |
| Example 2 | 0.066 | 24 | 35 | 80 | 12 | Good | Good | Good |
| Example 3 | 0.074 | 21 | 36 | 74 | 13 | Good | Good | Good |
| Comparative Example 1 | 0.051 | 12 | 55 | 60 | 34 | Good | Poor | Good |
| Comparative Example 2 | 0.059 | 9 | 56 | 60 | 12 | Good | Poor | Poor |

TABLE 1-continued

|  | DP (μm) | R(L) (%) | R(S) (%) | V/V$_0$ (%) | T (μm) | Power generation performance | | Durability |
|---|---|---|---|---|---|---|---|---|
|  |  |  |  |  |  | Standard conditions | High humidity conditions |  |
| Comparative Example 3 | 0.053 | 12 | 56 | 70 | 11 | Good | Poor | Poor |
| Comparative Example 4 | 0.126 | 50 | 25 | 60 | 20 | Poor | Good | Good |
| Comparative Example 5 | 0.138 | 48 | 27 | 65 | 12 | Poor | Poor | Poor |

As shown in Table 1, in all of Examples 1 to 3, the pore size Dp at the peak of the distribution curve of the pore volume Vp was in the range of 0.06 μm or more and 0.1 μm or less. In all of Examples 1 to 3, the percentage R(L) of the third integrated volume to the first integrated volume was in the range of 15% or more and 35% or less, and the percentage R(S) of the second integrated volume to the first integrated volume was in the range of 30% or more and 40% or less.

In all of Examples 1 to 3, the percentage of the integrated pore volume to the volume of the electrocatalyst layer was in the range of 65% or more and 90% or less. In all of Examples 1 to 3, the gradient of the distribution curve indicating distribution of the cumulative pore volume with respect to the first pore size (μm) range was in the range of 7 or more and 14 or less.

In all of Examples 1 to 3, the thickness of the electrocatalyst layer was in the range of 5 μm or more and 30 μm or less. In all of Examples 1 to 3, power generation performance was evaluated as good and durability was also evaluated as good, regardless of the measurement conditions. Specifically, the membrane electrode assemblies of Examples 1 to 3 were capable of configuring fuel cells having good power generation performance and good durability.

In all of Comparative Examples 1 to 5, the pore size Dp at the peak of the distribution curve of the pore volume Vp was outside the range of 0.06 μm or more and 0.1 μm or less. In all of Comparative Examples 1 to 5, the percentage R(L) of the third integrated volume to the first integrated volume was outside the range of 15% or more and 35% or less. In all of Comparative Examples 1 to 5, the percentage R(S) of the second integrated volume to the first integrated volume was outside the range of 30% or more and 40% or less.

In Comparative Examples 3 and 5, the percentage of the integrated pore volume to the volume of the electrocatalyst layer was in the range of 65% or more and 90% or less, whereas in Comparative Examples 1, 2 and 4, the percentage of the pore volume to the volume of the electrocatalyst layer was 60%. In Comparative Example 1, the thickness of the electrocatalyst layer exceeded 30 μm, whereas in Comparative Examples 2 to 5, the thickness of the electrocatalyst layer was in the range of 5 μm or more and 30 μm or less.

In Comparative Examples 1 to 5, power generation performance was evaluated to be poor under the standard conditions and/or high humidity conditions. In Comparative Examples 2, 3 and 5, durability was also evaluated to be poor. Thus, according to Comparative Examples 1 to 5, power generation performance and/or durability were impaired, compared to the above examples.

As described above, according to the electrocatalyst layer, the membrane electrode assembly, and the fuel cell of the first embodiment, the advantageous effects enumerated below can be achieved.

(1) When the pore size D is in the range of 0.06 μm or more and 0.1 μm or less, at the peak of the distribution curve indicating distribution of the pore volume Vp with respect to the pore size D, the electrocatalyst layer 12 contains voids for achieving sufficient gas diffusion and drainage, whereby power generation performance can be enhanced.

(2) When the percentage of the second integrated volume to the first integrated volume is in the range of 30% or more and 40% or less, the three-phase interface can be maintained in the electrocatalyst layer 12, and gas diffusion and drainage of the produced water can be enhanced, whereby power generation performance can be enhanced.

(3) When the percentage of the third integrated volume to the first integrated volume is in the range of 15% or more and 35% or less, the three-phase interface can be maintained while gas diffusion and drainage of the produced water can be enhanced, whereby power generation performance can be enhanced.

(4) When the gradient of the distribution curve indicating distribution of the cumulative pore volume with respect to the first pore size (μm) range is in the range of 7 or more and 14 or less, the three-phase interface can be maintained while gas diffusion and drainage of the produced water can be enhanced, whereby power generation performance can be enhanced.

[Second Embodiment]

Figure 6:
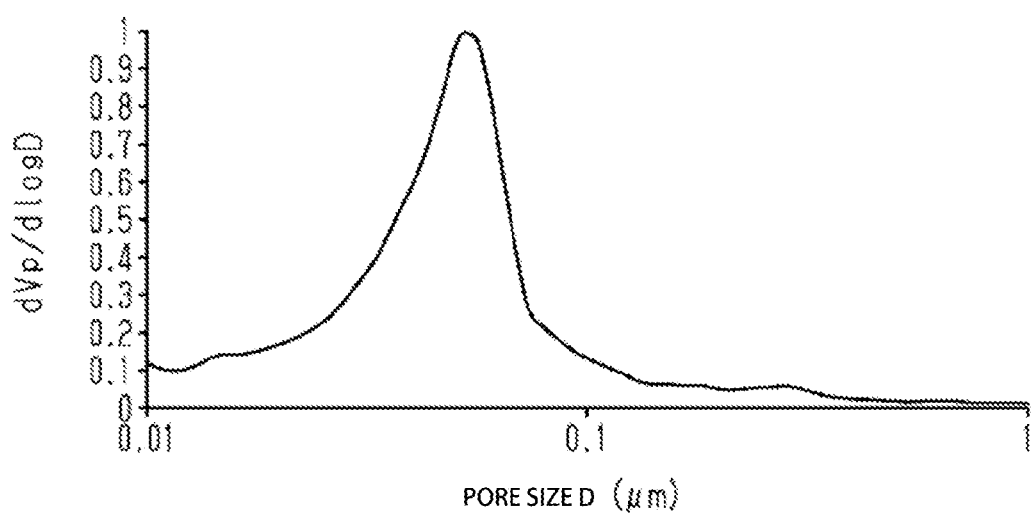
FIG. 6 is a graph illustrating an example a distribution curve for pore size according to a second embodiment.
Figure 7:
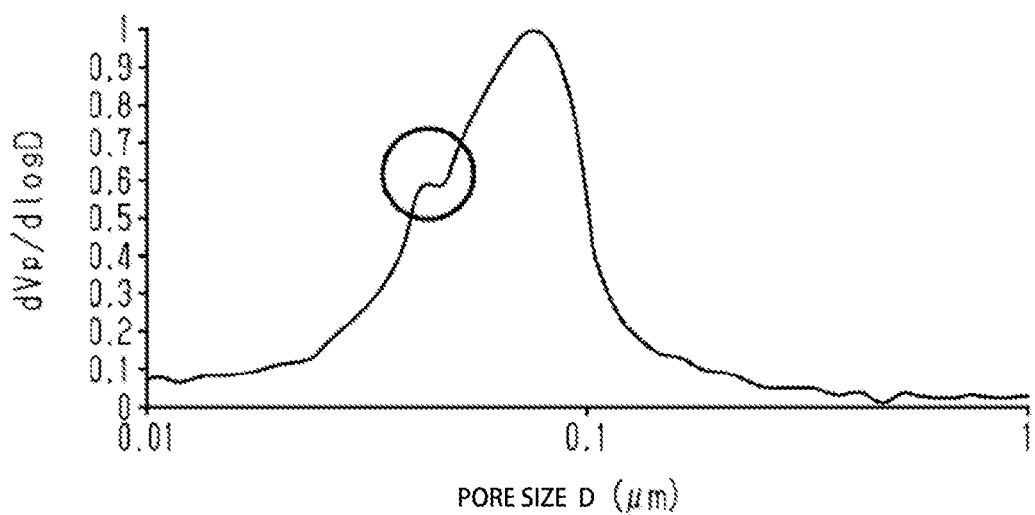
FIG. 7 is a graph illustrating an example of a distribution curve for pore size according to the second embodiment.
Figure 8:
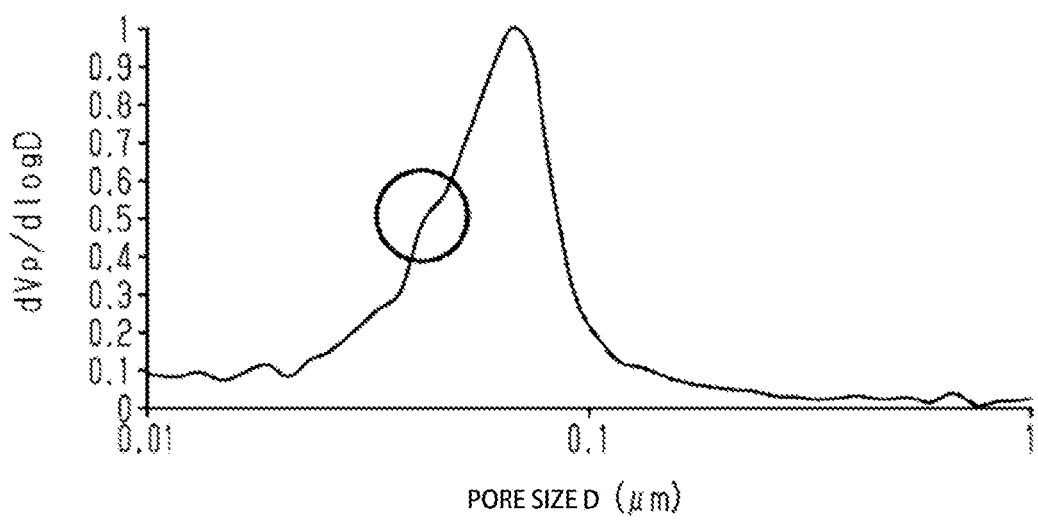
FIG. 8 is a graph illustrating another example of a distribution curve for pore size according to the second embodiment.

Referring to FIGS. 6 to 8, a second embodiment of an electrocatalyst layer, a membrane electrode assembly, and a polymer electrolyte fuel cell will be described. The second embodiment is different from the first embodiment in the configuration of the electrocatalyst layer. The second embodiment will be described focusing on the differences, omitting specific explanation of components common to the first embodiment by designating the same reference signs thereto as those of the first embodiment. In the following, an electrocatalyst layer and examples will be described in sequence.

[Electrocatalyst Layer]

Referring to FIGS. 6 to 8, an electrocatalyst layer will be described. The electrocatalyst layer described below has a configuration that is applied to both the oxygen- and fuel-electrode-side electrocatalyst layers 12C and 12A, but may be applied to either of the oxygen- and fuel-electrode-side electrocatalyst layers 12C and 12A.

In the present embodiment, each electrocatalyst layer 12 includes a catalytic material 21, an electrically conductive carrier 22, a polyelectrolyte 23 and a fibrous material 24, as in the electrocatalyst layer 12 of the first embodiment. The catalytic material 21 is supported on the electrically conductive carrier 22. In the electrocatalyst layer 12, the portions containing no catalytic material 21, electrically conductive carrier 22, polyelectrolyte 23 and fibrous material 24 are voids. The catalyst carrier is configured by the electrically conductive carrier 22, and the catalytic material 21 which is supported on the electrically conductive carrier 22. In the present embodiment, voids having a diameter in the range of 3 nm or more and 5.5 μm or less, are defined to be pores.

In the electrocatalyst layer 12, the diameter of a pore which is calculated from a pore volume Vp measured by mercury intrusion porosimetry is a pore size D. It should be noted that the pore size D is defined to be a size D of a cylindrical model pore acquired by mercury intrusion porosimetry. In the present embodiment, the pore size D is in the range of 3 nm or more and 5.5 μm or less.

The maximum value of the pore volumes Vp of the electrocatalyst layer 12 is a maximum volume Vmax, and the pore size D for the pores having the maximum volume Vmax is a maximum-volume size Dmax. In the present embodiment, the pore volumes Vp of the electrocatalyst layer 12 are normalized (proportionally converted) by defining the minimum value of the pore volume Vp to be 0 and the maximum volume Vmax to be 1.

In the electrocatalyst layer 12, the distribution of the pore volume Vp (pore volume distribution) with respect to the pore size D has a first peak top (Vmax, Dmax). Furthermore, the pore volume distribution of the electrocatalyst layer 12 is required to satisfy the following Condition 6. When the pore volume distribution of the electrocatalyst layer 12 satisfies Condition 6, the electrocatalyst layer 12 will have voids exerting sufficient gas diffusion and drainage.

[Condition 6]

The pore volume distribution has a shoulder peak point (Di, Vi) in a region where the pore size is smaller than the maximum-volume size Dmax and where the pore volume Vp is 0.2 or more.

The following description will be explained referring to FIGS. 6 to 8 which respectively show normalized distributions mentioned above. In these figures, the horizontal axis represents pore size D and the vertical axis represents pore volume Vp. FIG. 6 shows a pore volume distribution of the electrocatalyst layer 12 without containing the fibrous material 24. FIG. 7 shows an example of a pore volume distribution of the electrocatalyst layer 12 according to the present embodiment. FIG. 8 shows another example of a pore volume distribution of the electrocatalyst layer 12 according to the present embodiment.

In the pore volume distribution shown in FIG. 6, there is no shoulder peak point, or there is no shoulder peak point in the region where the pore size is smaller than the maximum-volume size Dmax. In contrast, in the distribution shown in FIG. 7, there is a shoulder peak point in the region where the pore size is smaller than the maximum-volume size Dmax and the pore volume Vp is 0.2 or more. In FIG. 7, the shoulder peak point is circled for ease of understanding.

The shoulder peak appears when two or more peaks of different sizes overlap in the pore volume distribution. The shoulder peak appears as part of the peak having a first peak top (Vmax, Dmax) as an apex.

As shown in FIG. 7, at a shoulder peak having a peak top as a local maximum point, the peak top at the shoulder peak is a shoulder peak point (Vi, Di).

As shown in FIG. 8, at a shoulder peak having no peak top as a local maximum point, an approximate curve of a first peak having a first peak top (Vmax, Dmax) as an apex is calculated first. A Gaussian function is used to approximate the first peak. Then, a difference (Vp−Vp1) is calculated as a difference between a pore volume (first pore volume Vp1) at the pore size Dp in the approximate curve, and a pore volume Vp at the pore size Dp of the pore volume distribution. The pore size Dp when the difference (Vp−Vp1) is a maximum is specified to be a specific pore size Di, and the pore volume Vp then is specified to be a pore volume Vi. That is, a shoulder peak point (Vi, Di) is specified. In this case, a difference (Vp−Vp1) of 0.01 or less, which is a minor difference and is less likely to contribute to exerting the functions of the shoulder peak, is not used for specifying a shoulder peak point (Vi, Di).

When a pore volume distribution has multiple shoulder peaks, a shoulder peak point (Vi, Di) is specified at a shoulder peak which is the closest to the first peak top (Vmax, Dmax) among the multiple shoulder peaks.

The first peak having a peak top (Vmax, Dmax) as an apex can be obtained such as by approximating the pore volume distribution with a Gaussian function or a Lorentz function. Since a Lorenz function tends to have a broader base than a Gaussian function, a Gaussian function is used in the present embodiment.

The maximum volume Vmax depends on the attributes of the fibrous material 24, such as the mixing ratio, diameter and length, or depends on the interaction between these attributes and the attributes of the catalyst carrier. The specific pore volume Vi depends on the attributes of the catalyst carrier, such as the mixing ratio and size, or depends on the interaction between these attributes and the attributes of the fibrous material 24. In the present embodiment, the fibrous material 24 and the catalyst carrier are combined so that the shoulder peak point (Di, Vi) derived from the attributes of the catalyst carrier and the first peak top (Vmax, Dmax) derived from the attributes of the fibrous material 24 satisfy the conditions described above. Thus, distribution of the pore volume Vp with respect to the pore size D becomes non-uniform. As a result, the three-phase interface is maintained while gas diffusion and drainage of the produced water are enhanced.

If the specific pore volume Vi is 0.2 or less, the pore volume distribution may become a monotonic normal distribution having a peak point as an apex, and it may be difficult to achieve distribution of the pore size D, which is partially non-uniform. If the specific pore volume Vi is larger than the maximum volume Vmax, the pore volume Vp of the specific pore size Di, which is smaller than the maximum-volume size Dmax, may occupy a large portion of the electrocatalyst layer 12, and sufficient gas diffusion and drainage may not be necessarily achieved. The specific pore volume Vi is preferred to be in the range of 0.3 or more and 0.8 or less, and more preferred to be 0.45 or more and 0.7 or less. If the shoulder peak point (Vi, Di) resides in these ranges, the pore volume distribution may be efficiently prevented from becoming a monotonic normal distribution.

It is preferred that the specific pore size Di is in the range of 0.03 μm or more and 0.06 μm or less, and the maximum-volume size Dmax is in the range of 0.06 μm or more and 0.1 μm or less. If the specific pore volume Vi and the maximum volume Vmax are in the above ranges, regions where the pores are relatively sparse and large due to the fibrous material 24 may be balanced with regions where the pores are relatively dense and small due to the catalyst carrier, thereby enhancing gas diffusion and drainage.

The difference (Dmax−Di) between the specific pore size Di and the maximum-volume size Dmax is preferred to be 0.02 μm or more. In a configuration where the difference (Dmax−Di) is 0.02 μm or more, the pore volume distribution may approximate to multimodality. Accordingly, sufficient gas diffusion and drainage may be easily achieved. In a configuration where the difference (Dmax−Di) is more than 0.07 μm, the porosity difference may increase. Accordingly, power generation performance may tend to be impaired under a low-humidity environment, although it may be satisfactory under a high-humidity environment.

The difference (Vp−Vp1) between the pore volume Vp1 at the first peak (approximate curve) having a first peak top (Vmax, Dmax) as an apex and the pore volume Vp of the pore volume distribution is preferred to be 0.03 or more, and more preferred to be 0.06 or more, at the shoulder peak point (Vi, Di). In a configuration where the difference (Vp−Vp1) is 0.03 or more, the pore volume distribution may tend to be multimodal. The difference value (Vp−Vp1) is preferred to have an upper limit of 0.2 or less to balance regions where the pores are relatively sparse and large due to the fibrous material 24, with regions where the pores are relatively dense and small due to the catalyst carrier.

As described above, the reaction expressed by the above Reaction Formula (1) occurs at the fuel electrode 30A of the polymer electrolyte fuel cell 30. In contrast, the reaction expressed by the above Reaction Formula (2) occurs at the oxygen electrode 30C. Thus, similar to the electrocatalyst layer 12 of the first embodiment, the electrocatalyst layer 12 of the present embodiment has high drainage performance by satisfying the conditions described above. Therefore, such an electrocatalyst layer 12 is preferred to be applied to the electrocatalyst layer 12 of the oxygen electrode 30C. In this way, the effect of enhancing power generation performance of the polymer electrolyte fuel cell 30 can be improved.

For example, as the mixing ratio of the catalytic carrier is increased, the shoulder peak point (Vi, Di) may appear more easily. However, if the mixing ratio of the catalytic carrier is excessively high, the shoulder peak may appear in a region where the pore size is larger than the maximum-volume size Dmax. For example, if the fibrous material 24 is mixed in, the shoulder peak point (Vi, Di) may appear more easily. However, if the mixing ratio of the fibrous material 24 is excessively high, the distribution may be broadened and the shoulder peak may not appear. For example, as the size of the catalyst carrier is made smaller than the diameter of the fibrous material 24, the shoulder peak point (Vi, Di) may be shifted to a smaller pore size side.

Examples

Example 4

Platinum on carbon catalyst (TEC10E50E manufactured by Tanaka Kikinzoku Kogyo Co., Ltd.), water, 1-propanol, polyelectrolyte (Nafion (trademark) dispersion manufactured by Wako Pure Chemical Industries, Ltd.), and carbon nanofibers (VGCF (trademark)-H manufactured by Showa Denko K.K.) were mixed. In the platinum on carbon catalyst, a platinum catalyst is supported on carbon particles. The ratio of the mass of the carbon particles to the mass of the polyelectrolyte was 1:1. The mixture was then subjected to dispersion processing using a planetary ball mill at 300 rpm for 60 minutes. In this case, zirconia balls having a diameter of 5 mm were added to about one third of the zirconia container. A catalyst ink was thereby prepared. The catalyst ink was prepared so that the mass of the polyelectrolyte was 100 mass % relative to the mass of the carbon particles, the mass of the fibrous material was 100 mass % relative to the mass of the carbon particles, the proportion of water in the dispersion medium was 50 mass %, and the solid content of the catalyst ink was 10 mass %.

The catalyst ink was applied to both surfaces of a polyelectrolyte membrane (Nafion (trademark) 211 manufactured by Dupont) by using a slit die coater to form a coating film. In this case, the catalyst ink was applied to the polyelectrolyte membrane so as to have a thickness of 150 μm on the cathode surface, and a thickness of 100 μm on the anode surface. The polyelectrolyte membrane provided with the coating films was then placed in a hot air oven heated to 80° C. and dried until the tackiness of the coating films disappeared. In this way, a membrane electrode assembly of Example 4 was obtained.

Example 5

A membrane electrode assembly of Example 5 was obtained as in Example 4, except that multiwall carbon nanotubes (60 nm to 100 nm in diameter, manufactured by Tokyo Chemical Industry Co., Ltd.) were used in place of carbon nanofibers.

Example 6

A membrane electrode assembly of Example 6 was obtained as in Example 4, except that the amount of carbon nanofibers was ½ of that of Example 4 when preparing the catalyst ink.

Example 7

A catalyst ink was prepared as in Example 4. The catalyst ink was applied to a surface of a PTFE film by using a slit die coater to form a coating film. The PTFE film was then placed in a hot air oven heated to 80° C. and dried until the tackiness of the coating film disappeared. In this way, a substrate having a catalyst layer was obtained. A substrate having an oxygen-electrode-side electrocatalyst layer and a substrate having a fuel-electrode-side electrocatalyst layer were prepared. In this case, the catalyst ink was applied to the polyelectrolyte membrane so as to have a thickness of 150 μm on the cathode surface, and a thickness of 60 μm on the anode surface. The substrates each having a catalyst layer were respectively disposed on the two surfaces of a polyelectrolyte membrane (Nafion (trademark) 211 manufactured by Dupont) to form a laminate. The laminate was hot-pressed at 120° C. and 5 MPa to bond the two electrocatalyst layers to the polyelectrolyte membrane. Then, the PTFE films were separated from the respective electrocatalyst layers to obtain a membrane electrode assembly of Example 7.

Example 8

A membrane electrode assembly of Example 8 was obtained as in Example 4, except that the amount of carbon nanofibers was changed to 2 times of that of Example 4 when preparing the catalyst ink.

Comparative Example 6

A membrane electrode assembly of Comparative Example 6 was obtained as in Example 4, except that carbon nanotubes (NC7000 manufactured by Nanocyl SA) were used in place of carbon nanofibers.

Comparative Example 7

A membrane electrode assembly of Comparative Example 7 was obtained as in Example 4, except that no carbon nanofibers were added when preparing the catalyst ink.

Comparative Example 8

A membrane electrode assembly of Comparative Example 8 was obtained as in Example 4, except that the amount of carbon nanofibers was 1/10 of that of Example 4 when preparing the catalyst ink.

[Pore Volume Distribution]

Pore volume distribution was measured by mercury intrusion porosimetry. Specifically, the pore volume Vp was measured by using an automated porosimeter (Autopore IV9510 manufactured by Micromeritics) for a membrane electrode assembly in which only an oxygen-electrode-side electrocatalyst layer was formed on a polyelectrolyte membrane. The measured cell had a volume of approximately 5 cm$^3$, and the pressure of mercury injection was increased stepwise from 3 kPa to 400 MPa. In this way, the injection amount of mercury, or pore volume Vp, at each pressure was obtained. Each pressure of mercury injection was converted to a pore size D by using Washburn's equation, and the pore volume Vp with respect to the pore size D was plotted as a distribution function dVp/d log D. The surface tension γ was taken to be 0.48 N/m, and the contact angle θ was taken to be 130°. This plot was a pore volume distribution, which was normalized.

A maximum volume Vmax and a maximum-volume size Dmax were detected from the normalized pore volume distribution. The maximum volume Vmax was 1 because the pore volumes distribution had been normalized. Then, a specific pore volume Vi, a specific pore size Di, and a specific difference (Vp−Vp1) were detected by using the pore volume distribution.

[Measurements of Thickness Of Electrocatalyst Layer]

A cross section of the electrocatalyst layer was observed by using a scanning electron microscope (SEM) to measure the thickness of the electrocatalyst layer. Specifically, a cross section of the electrocatalyst layer was observed at 1,000 times magnification by using a scanning electron microscope (FE-SEM S-4800 manufactured by Hitachi High-Technologies, Ltd., currently Hitachi High-Tech Corporation). The thickness of the electrocatalyst layer was measured at 30 observation points of the cross section. The average of the thicknesses at the 30 observation points was defined to be the thickness of the electrocatalyst layer.

[Measurements of Power Generation Performance]

Power generation performance was measured by using a method according to a booklet titled "Cell unit evaluation and analysis protocol" and published by the New Energy and Industrial Technology Development Organization (NEDO). A JARI standard cell was used as a cell unit for evaluation. In the JARI standard cell, a gas diffusion layer, a gasket, and a separator were disposed on each surface of a membrane electrode assembly and pressed against the surface to achieve a predetermined surface pressure. Then, IV measurements were performed according to the method described in the booklet "Cell unit evaluation and analysis protocol". These conditions were defined to be standard conditions. Also, IV measurements were performed with the relative humidities of the anode and cathode both being set to RH 100%. These conditions were defined to be high humidity conditions.

[Measurements of Durability]

For measuring durability, the same cell unit as in the measurements of power generation performance was used as a cell unit for evaluation. Durability was measured by conducting the humidity cycle test described in the booklet "Cell unit evaluation and analysis protocol" mentioned above.

[Comparisons]

Table 1 shows measurements for the fuel cells respectively including the membrane electrode assemblies of Examples 4 to 8 and Comparative Examples 6 to 8, as well as power generation performance and durability of these assemblies.

For power generation performance under the standard conditions, cell units having a current of 25 A or more at a voltage of 0.6 V were evaluated as good, and cell units having a current of less than 25 A at a voltage of 0.6 V were evaluated as poor. Under the high humidity conditions, cell units having a current of 30 A or more at a voltage of 0.6V were evaluated as good, and cell units having a current of less than 30 A at a voltage of 0.6 V were evaluated as poor. For durability, cell units having a hydrogen cross leak current of less than 10 times of the initial value after the lapse of 8,000 cycles were evaluated as good, and cell units having a hydrogen cross leak current of 10 times or more of the initial value after the lapse of 8,000 cycles were evaluated as poor.

TABLE 2

| | Dmax (μm) | Vi | Di (μm) | Dmax−Di (μm) | Vi−f(Di) | T (μm) | Power generation performance | | Durability |
| --- | --- | --- | --- | --- | --- | --- | --- | --- | --- |
| | | | | | | | Standard conditions | High humidity conditions | |
| Example 4 | 0.074 | 0.59 | 0.043 | 0.031 | 0.10 | 15 | Good | Good | Good |
| Example 5 | 0.070 | 0.52 | 0.042 | 0.028 | 0.09 | 12 | Good | Good | Good |
| Example 6 | 0.066 | 0.50 | 0.042 | 0.024 | 0.07 | 13 | Good | Good | Good |
| Example 7 | 0.072 | 0.52 | 0.042 | 0.030 | 0.08 | 13 | Good | Good | Good |
| Example 8 | 0.126 | 0.42 | 0.045 | 0.081 | 0.04 | 20 | Poor | Good | Good |
| Comparative Example 6 | 0.055 | — | — | — | — | 12 | Good | Poor | Poor |
| Comparative Example 7 | 0.050 | — | — | — | — | 11 | Good | Poor | Poor |
| Comparative Example 8 | 0.054 | — | — | — | — | 12 | Good | Poor | Poor |

As shown in Table 2, in all of Examples 4 to 8, the pore volume distribution had a shoulder peak point (Di, Vi) satisfying the required conditions in a region where the pore size was smaller than the maximum-volume size Dmax and where the pore volume Vp was 0.2 or more. Furthermore, power generation performance and durability under the high humidity conditions were good. In Examples 4 to 8, membrane electrode assemblies that could configure fuel cells having good power generation performance and durability under the high humidity conditions were obtained.

None of Comparative Examples 6 to 8 had a pore volume distribution with a shoulder peak point (Vi, Di) in a region where the pore size was smaller than the maximum-volume size Dmax and where the pore volume Vp was 0.2 or more. Furthermore, power generation performance under the high humidity conditions was poor.

In other words, in Comparative Examples 6 and 8, no shoulder peak point (Vi, Di) was detected, and in Comparative Example 7, in which the maximum volume Vmax was derived from the catalyst carrier, the non-uniform distribution of the pore volume Vp with respect to the pore size D was insufficient for enhancing power generation performance under the high humidity conditions. In this regard, in Examples 4 to 8, the shoulder peak point (Vi, Di) was detected, and the non-uniform distribution of the pore volume Vp with respect to the pore size D was sufficient for enhancing power generation performance under the high humidity conditions.

As described above, according to the electrocatalyst layer, the membrane electrode assembly, and the fuel cell of the second embodiment, the advantageous effects enumerated below can be obtained.

(5) When the pore volume distribution has a shoulder peak point (Vi, Di) in a region where the pore size is smaller than the maximum-volume size Dmax and where the pore volume Vp is 0.2 or more, the electrocatalyst layer 12 contains voids for achieving sufficient gas diffusion and drainage, whereby power generation performance can be enhanced under the high humidity conditions.

(6) When the specific pore volume Vi is in the range of 0.3 or more and 0.8 or less, the pore volume distribution can be more effectively prevented from having a monotonic normal distribution shape, whereby an advantageous effect comparable to Item (5) above can be achieved.

(7) When the difference (Vp−Vp1) is 0.03 or more, the pore volume distribution can be more effectively prevented from having a monotonic normal distribution shape, whereby an advantageous effect comparable to Item (5) above can be achieved.

(8) When the specific pore size Di is in the range of 0.03 μm or more and 0.06 μm or less, regions where the pores are relatively sparse and large can be balanced with regions where the pores are relatively dense and small, and an advantageous effect comparable to Item (5) above can be achieved.

(9) When the difference between the specific pore size Di and the maximum-volume size Dmax is in the range of 0.02 μm or more and 0.07 μm or less, a porosity difference suitable for achieving power generation performance under the standard conditions is obtained.

[Modifications of Second Embodiment]

The electrocatalyst layer 12 of the second embodiment can be combined with the configuration of the electrocatalyst layer 12 of the first embodiment. Specifically, the electrocatalyst layer 12 of the second embodiment may satisfy at least one of Conditions (1) to (5) in addition to Condition (6) set forth above.

[Third Embodiment]

Referring to FIGS. 9 to 13, a third embodiment of a membrane electrode assembly and a polymer electrolyte fuel cell will be described. The third embodiment is different from the first embodiment in the configuration of the membrane electrode assembly. The third embodiment will be described focusing on the differences, omitting specific explanation of components common to the first embodiment by designating the same reference signs thereto as those of the first embodiment.

[Membrane Electrode Assembly]

Referring to FIGS. 9 to 13, a configuration of a membrane electrode assembly 10 will be described. In the present embodiment, the oxygen-electrode-side electrocatalyst layer 12C contains a fibrous material 24, but the fuel-electrode-side electrocatalyst layer 12A may or may not contain the fibrous material 24. The fuel-electrode-side electrocatalyst layer 12A contains a first catalytic material, a first electrically conductive carrier, and a first polyelectrolyte. The oxygen-electrode-side electrocatalyst layer 12C contains a second catalytic material, a second conductive carrier, a second polyelectrolyte, and a fibrous material. The first catalytic material may be the same as or different from the second catalytic material. The first electrically conductive carrier may be the same as or different from the second electrically conductive carrier. The first catalytic material may be the same as or different from the second catalytic material.

In the electrocatalyst layer 12, the portions containing no catalytic material 21, electrically conductive carrier 22, polyelectrolyte 23 and fibrous material 24 are voids. In the present embodiment, voids having a diameter in the range of 3 nm or more and 5.5 μm or less, are defined to be pores. Specifically, the membrane electrode assembly 10 includes voids, and the voids include pores each having a size in the range of 3 nm or more and 5.5 μm or less.

In the membrane electrode assembly 10, pore volumes Vp of pores having a specific pore size D are measured and calculated by mercury intrusion porosimetry. It should be noted that the pore size D is defined to be a size D of a cylindrical model pore acquired by mercury intrusion porosimetry.

Distribution of the pore volume Vp mentioned above will be described. Distribution of the pore volume Vp is expressed as a distribution function of the pore volume Vp (=dVp/d log D) (log differential pore volume distribution) for the pore size D (3 nm≤D≤5.5 μm). Distribution of the pore volume Vp is obtained by mercury intrusion porosimetry. The pore volumes Vp correspond to a sum of volumes of the pores having a specific pore size D among the pores.

Since mercury has a high surface tension, a predetermined pressure P is required to be applied thereto for entry into pores. Distribution of the pore volume Vp or a specific surface area can be calculated from a pressure P applied to the mercury to enter the pores, and the amount of mercury injected into the pores. The relationship between the applied pressure P and the pore size D enabling mercury to enter therein with the pressure P can be expressed by Formula (1) which is known as Washburn's equation. In Formula (1) below, γ is the surface tension of mercury, and θ is the contact angle between mercury and the wall surface of a pore. In the present embodiment, a pore size D is calculated assuming the surface tension γ to be 0.48 N/m and the contact angle θ to be 130°.

$$D = -4\gamma \cos \theta / P \tag{1}$$

It should be noted that, in actual measurements based on mercury intrusion porosimetry, the volume of injected mercury is recorded every time a different pressure P is applied. Then, each pressure P is converted to a pore size D based on Formula (1). Assuming that the volume of the injected mercury is equal to the pore volume Vp, a pore volume increase dV is plotted against the pore size D. The pore volume increase dV in this case is an increase of the pore volume Vp when the pore size has increased from D to D+dD. The peak of the plot is the peak of the distribution of the pore volume Vp.

Functions required for enhancing power generation performance in the membrane electrode assembly 10 are, for example, maintaining a three-phase interface in the electrocatalyst layer 12 included in the membrane electrode assembly 10, diffusing gas in the electrocatalyst layer 12, and draining water produced in the electrocatalyst layer 12. The pore size D suitable for maintaining the three-phase interface, the pore size D suitable for diffusing gas, and the pore size D suitable for draining produced water are different from each other. The pore size D suitable for maintaining the three-phase interface, the pore size D suitable for diffusing gas, and the pore size D suitable for draining produced water do not have to be necessarily the same, but may include ranges different from each other. The pore sizes D suitable for gas diffusion in the oxygen- and fuel-electrode-side electrocatalyst layers 12C and 12A are also different from each other. The pore size D suitable for enhancing power generation performance is required to satisfy these pore sizes D. The three-phase interface refers to an interface formed by a polyelectrolyte, a catalyst and a gas.

From the perspectives mentioned above, the membrane electrode assembly 10 is required to satisfy at least one of the following Conditions 7, 9, 10 and 11.

[Condition 7]

The pore size D at the peak of the distribution curve indicating distribution of the pore volume Vp with respect to the pore size D is in the range of 0.06 or more and 0.11 μm or less (0.06 μm≤D<0.11 μm). If the pore size D at the peak of the distribution curve is in the range of 0.06 μm or more and 0.11 μm or less, the electrocatalyst layer 12 can contain voids for achieving sufficient gas diffusion and drainage.

Figure 9:
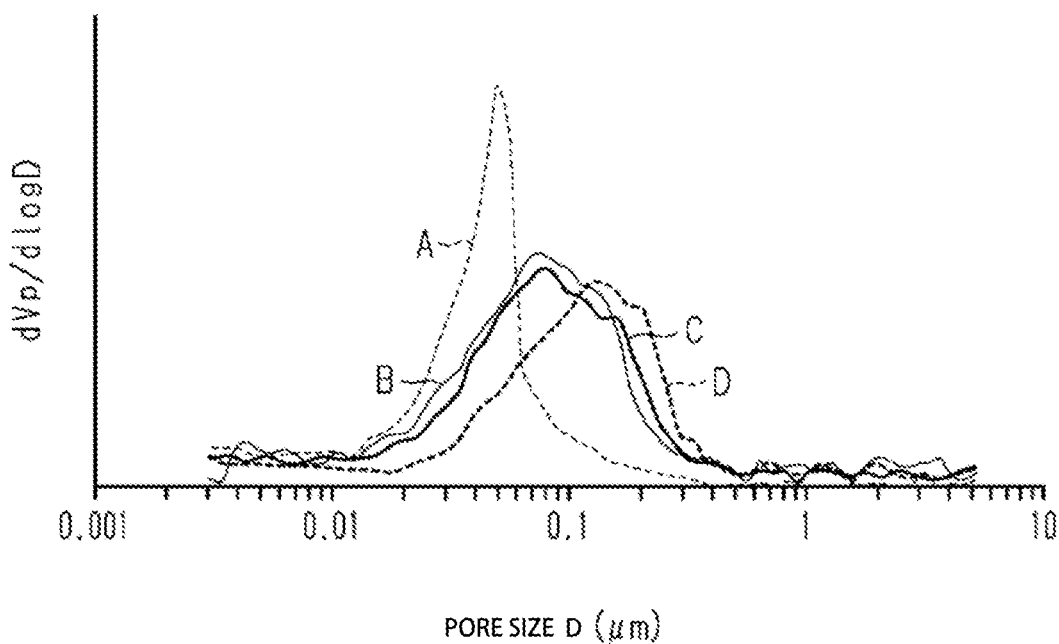
FIG. 9 is a graph illustrating an example of distribution curves for pore size in an electrocatalyst layer according to a third embodiment.

FIG. 9 shows an example of distribution curves each indicating distribution of the pore volume Vp with respect to the pore size D.

As shown in FIG. 9, the pore sizes D at the peaks of the distribution curves B and C are in the range of 0.06 or more and 0.11 μm or less. In contrast, the pore sizes D at the peaks of the distribution curves A and D are outside the range of 0.06 μm or more and 0.11 μm or less. More specifically, the pore size D at the peak of the distribution curve A is less than 0.06 μm. In contrast, the pore size D at the peak of the distribution curve D is more than 0.11 μm.

When the membrane electrode assembly 10 satisfies Condition 7, the following Condition 8 is also preferred to be satisfied.

[Condition 8]

The full width at half maximum in the distribution curve indicating distribution of the pore volume Vp with respect to the pore size D is preferred to be in the range of 0.13 μm or more and 0.18 μm or less. The full width at half maximum is more preferred to be in the range 0.14 μm or more and 0.17 μm or less. When the pore size at the position of the peak in a distribution curve f(D) is defined to be f(Dmax), minimum and maximum pore sizes D satisfying f(Dmax)/2 are respectively defined to be a minimum size D1 and a maximum size D2. In this case, a difference (D2−D1) obtained by subtracting the minimum size D1 from the maximum size D2 is defined to be a full width at half maximum.

Reaction in the polymer electrolyte fuel cell 30 is expressed by the above Reaction Formulas (1) and (2) set forth above. Specifically, fuel gas and oxidant gas of a predetermined ratio are required to be fed into the membrane electrode assembly 10 to promote reaction in the polymer electrolyte fuel cell 30.

Figure 10:
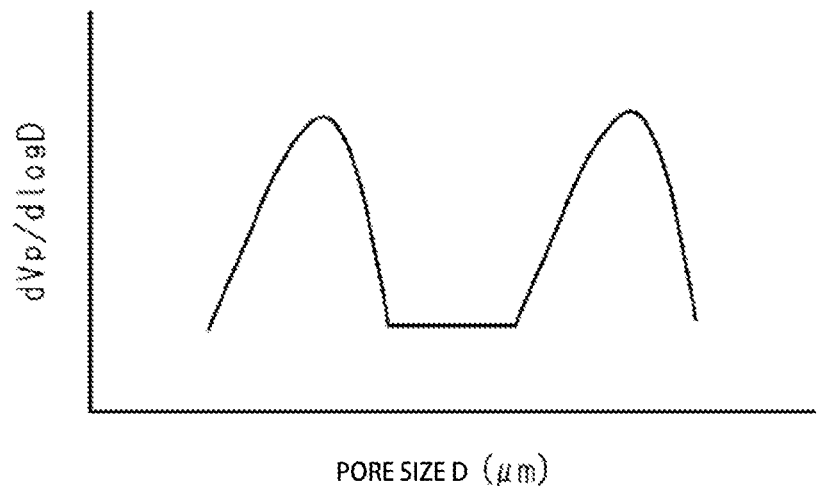
FIG. 10 is a graph illustrating an example of a distribution curve for pore size having multimodality.

As shown in FIG. 10, the distribution curve of the pore volume Vp may have multimodality. FIG. 10 shows a distribution curve of the pore volume Vp having bimodality, which is an example of multimodality. It is difficult to achieve bimodality in the distribution curve of the pore volume Vp by only the oxygen-electrode-side electrocatalyst layer 12C or the fuel-electrode-side electrocatalyst layer 12A. Therefore, if distribution of the pore volume Vp has bimodality, distribution of the pore volume Vp may be different between the oxygen- and fuel-electrode-side electrocatalyst layers 12C and 12A. Thus, if distribution of the pore volume Vp of the membrane electrode assembly 10 has a peak originating from the oxygen-electrode-side electrocatalyst layer 12C and a peak originating from the fuel-electrode-side electrocatalyst layer 12A, the distribution curve of the pore volume Vp of the membrane electrode assembly 10 may have bimodality. In this case, the distribution of the pore size D may also be unbalanced between the oxygen- and fuel-electrode-side electrocatalyst layers 12C and 12A.

In this way, if the distribution curve of the pore volume Vp has bimodality, it is very likely that distribution of the pore size D is unbalanced between the oxygen- and fuel-electrode-side electrocatalyst layers 12C and 12A. Accordingly, sufficient reaction gas needed for power generation is not necessarily supplied to the oxygen- and fuel-electrode-side electrocatalyst layers 12C and 12A, and power generation performance may be impaired.

Figure 11:
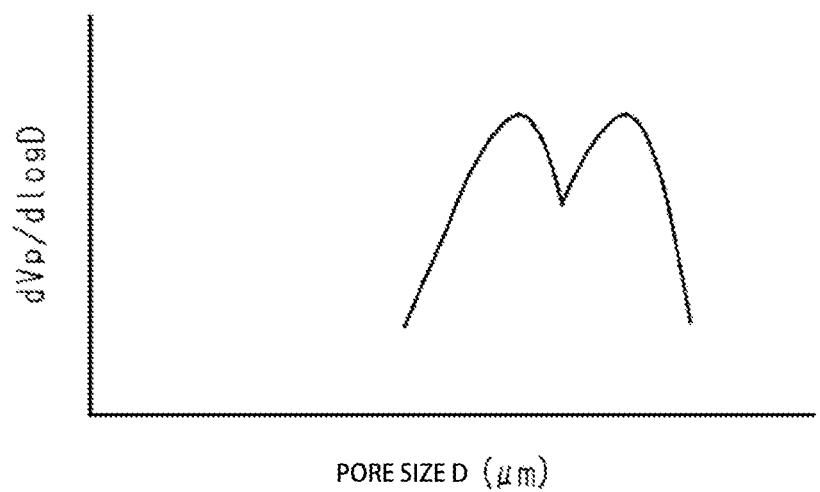
FIG. 11 is a graph illustrating another example of a distribution curve for pore size having multimodality.

As shown in FIG. 11, as the distribution of the pore size D is balanced more between the oxygen- and fuel-electrode-side electrocatalyst layers 12C and 12A, the distribution curve of the pore volume Vp may accordingly have a near unimodal shape.

When the distribution curve of the pore volume Vp has unimodality, but the full width at half maximum of the distribution curve is more than 0.18 μm, the range of distribution of the pore size D in each electrocatalyst layer 12 may be excessively wide. If the full width at half maximum of the distribution curve is less than 0.13 μm, the range of distribution of the pore size D in each electrocatalyst layer 12 may be excessively narrow. Therefore, power generation performance of the polymer electrolyte fuel cell 30 may be impaired for the same reasons as in the bimodal case. In other words, if the full width at half maximum is 0.18 μm or less, the range of distribution of the pore size D may be prevented from becoming excessively wide. If the full width at half maximum is 0.13 μm or more, the range of distribution of the pore size D may be prevented from becoming excessively narrow. In this way, when the full width at half maximum is in the range of 0.13 μm or more and 0.18 μm or less, distribution of the pore size D can be in a suitable range. Thus, power generation performance of the polymer electrolyte fuel cell 30 including the membrane electrode assembly 10 can be enhanced.

[Condition 9]

In the membrane electrode assembly 10, the value obtained by integrating the pore volumes Vp of pores having a pore size D in the entire range is a first integrated volume (ΣVp 1). The value obtained by integrating the pore volumes Vp of pores having a pore size D of 50 nm or less is a second integrated volume (ΣVp 2). In Condition 9, the percentage of the second integrated volume to the first integrated volume (ΣVp 2/ΣVp 1×100) is in the range of 25% or more and 45% or less.

[Condition 10]

In the membrane electrode assembly 10, the value obtained by integrating the pore volumes Vp of pores having a pore size D of 100 nm or more is a third integrated volume (ΣVp 3). In Condition 10, the percentage of the third integrated volume to the first integrated volume (ΣVp 3/ΣVp 1×100) is in the range of 30% or more and 50% or less.

As in the case where Conditions 9 and 10 are satisfied, if the pores of the membrane electrode assembly 10 include pores having a relatively large size in the above ratio, the three-phase interface can be maintained in the electrocatalyst layer 12 of the membrane electrode assembly 10, and gas diffusion and drainage of the produced water can be enhanced in the electrocatalyst layer 12. If the pores of the electrocatalyst layer 12 include pores having a relatively small size within the above range, the three-phase interface can be maintained in the electrocatalyst layer 12, and gas diffusion and drainage of the produced water can be enhanced in the electrocatalyst layer 12.

[Condition 11]

For the distribution curve indicating distribution of the pore volume Vp with respect to the pore size D in the membrane electrode assembly 10, the value obtained by integrating the pore volumes Vp of the pores having a pore size in the entire range is a first log differential integrated volume (Σ(dVp/d(log D))1). For the distribution curve, the value obtained by integrating the pore volumes of pores having a pore size D of 60 nm or less is a second log-differential integrated volume (Σ(dVp/d(log D))2). The percentage of the second log differential integrated volume to the first log differential integrated volume (Σ(dVp/d(log D))2/Σ(dVp/d(log D))1×100) is in the range of 30% or more and 60% or less.

For the distribution curve indicating distribution of the pore volume Vp with respect to the pore size D, the value obtained by integrating the pore volumes Vp of pores having a pore size D of 100 nm or more is a third log differential integrated volume (Σ(dVp/d(log D))3). The percentage of the third log differential integrated volume to the first log differential integrated volume (Σ(dVp/d(log D))3/Σ(dvp/d(log D))1) is in the range of 30% or more and 60% or less.

If Condition 11 is satisfied, the membrane electrode assembly 10 may contain pores having a relatively large size in the ratio mentioned above and pores having a relatively small size in the ratio mentioned above. Therefore, the three-phase interface can be maintained in the electrocatalyst layer 12 of the membrane electrode assembly 10, and gas diffusion and drainage of the produced water can be enhanced in the electrocatalyst layer 12.

If the membrane electrode assembly 10 satisfies Condition 11, the following Condition 12 is more preferred to be satisfied.

[Condition 12]

The ratio of the second log differential integrated volume to the third log differential integrated volume in Condition 11 is in the range of 0.7 or more and 1.5 or less. If Condition 12 is satisfied, the ratio of the relatively small pores to the relatively large pores may be in the range which is suitable for maintaining the three-phase interface and enhancing gas diffusion and drainage of the produced water. This may further enhance power generation performance of the polymer electrolyte fuel cell 30 to which the membrane electrode assembly 10 is applied.

If the oxygen- and fuel-electrode-side electrocatalyst layers 12C and 12A both contain the fibrous material 24, the mass of the fibrous material 24 per unit volume of the fuel-electrode-side electrocatalyst layer 12A is preferred to be greater than the content of the fibrous material 24 per unit volume of the oxygen-electrode-side electrocatalyst layer 12C. If the mass of the fibrous material 24 per unit volume of the fuel-pole-side electrocatalyst layer 12A is large, the fuel-electrode-side electrocatalyst layer 12A is more likely to contain pores having a larger pore size D than is the oxygen-electrode-side electrocatalyst layer 12C. In this way, the fuel gas may more efficiently flow into the membrane electrode assembly 10. The fibrous material 24 may be the same or may be different between the oxygen- and fuel-electrode-side electrocatalyst layers 12C and 12A By observing a cross section of the membrane electrode assembly 10 by using a scanning electron microscope (SEM), the content of the fibrous material 24 can be compared between the oxygen- and fuel-electrode-side electrocatalyst layers 12C and 12A. Specifically, a cross section of the membrane electrode assembly 10 may be observed at 1,000 times magnification by using a scanning electron microscope (FE-SEM S-4800 manufactured by Hitachi High-Technologies, Ltd., currently Hitachi High-Tech Corporation) to randomly extract 30 observation points from each of the oxygen- and fuel-electrode-side electrocatalyst layers 12C and 12A. Then, individual observation points may be randomly extracted from the 30 observation points of each of the electrocatalyst layers 12 to sequentially compare the extracted observation points between the oxygen- and fuel-electrode-side electrocatalyst layers 12C and 12A. The extracted observation points may be visually observed and the content of the fibrous material 24 may be compared between the oxygen- and fuel-electrode-side electrocatalyst layers 12C and 12A to determine which is larger. Based on observation and comparison at the 30 observation points between the oxygen- and fuel-electrode-side electrocatalyst layers 12C and 12A, the content of the fibrous material 24, as to which is higher or lower, can be determined by majority.

For example, the content of the fibrous material 24 in the fuel-electrode-side electrocatalyst layer 12A may be determined to be higher than the content of the fibrous material 24 in the oxygen-electrode-side electrocatalyst layer 12C at the majority of observation points. In this case, the mass of the fibrous material 24 per unit volume in the fuel-electrode-side electrocatalyst layer 12A can be determined to be greater than the mass of the fibrous material 24 per unit volume in the oxygen-electrode-side electrocatalyst layer 12C.

The percentage (V/V$_0$×100(%)) of the integrated volume V obtained by integrating the pore volumes of all the pores in the electrocatalyst layer 12 to the geometric volume V$_0$ of the electrocatalyst layer 12 is preferred to be in the range of 60% or more and 90% or less. This allows the electrocatalyst layer 12 to provide better gas diffusion and drainage. The geometric volume V$_0$ of the electrocatalyst layer 12 is obtained by subtracting the product of the area and thickness of the polyelectrolyte membrane 11 from the product of the area and thickness of the membrane electrode assembly 10 used for the measurements based on mercury intrusion porosimetry.

The oxygen-electrode-side electrocatalyst layer 12C is preferred to have a thickness in the range of 5 µm or more and 30 µm or less. If the oxygen-electrode-side electrocatalyst layer 12C has a thickness of 30 µm or less, the occurrence of cracking may be minimized in the oxygen-electrode-side electrocatalyst layer 12C. Use of the oxygen-electrode-side electrocatalyst layer 12C for a polymer electrolyte fuel cell 30 may prevent diffusion of the gas or produced water and electrical conductivity from being impaired, and further, may prevent the output of the polymer electrolyte fuel cell 30 from being lowered. The oxygen-electrode-side electrocatalyst layer 12C, if it has a thickness of 5 µm or more, may be less likely to suffer thickness variation, and accordingly the catalytic material 21 or the polyelectrolyte 23 contained therein may be prevented from being non-uniformly distributed. Cracking on the surface of the oxygen-electrode-side electrocatalyst layer 12C or uneven thickness thereof are undesirable because they are very likely to adversely affect durability of the polymer electrolyte fuel cell 30 if the oxygen-electrode-side electrocatalyst layer 12C is used as part thereof and if the polymer electrolyte fuel cell 30 is operated for a long period of time.

The fuel-electrode-side electrocatalyst layer 12A is preferred to have a thickness in the range of 5 µm or more and 20 µm or less. If the thickness of the fuel-electrode-side electrocatalyst layer 12A is 20 µm or less, the occurrence of cracking may be minimized. Use of the fuel-electrode-side electrocatalyst layer 12A for the polymer electrolyte fuel cell 30 may prevent gas diffusion or electrical conductivity from being impaired, and further, may prevent the output of the polymer electrolyte fuel cell 30 from being lowered. The fuel-electrode-side electrocatalyst layer 12A, if it has a thickness of 5 µm or more, may be less likely to suffer thickness variation, and accordingly the catalytic material 21 or the polyelectrolyte 23 contained therein is prevented from being non-uniformly distributed. Cracking on the surface of the fuel-electrode-side electrocatalyst layer 12A or uneven thickness thereof are undesirable because they are very likely to adversely affect durability of the polymer electrolyte fuel cell 30 if the fuel-electrode-side electrocatalyst layer 12A is used as part thereof and if the polymer electrolyte fuel cell 30 is operated for a long period of time.

The size and distribution of the pores of the electrocatalyst layers 12 can be controlled by controlling the temperature of heating the catalyst ink coating film, the rate of heating the coating film, the pressing conditions under which the catalyst ink is dried, the mixing ratio of the fibrous material 24, the mixing ratio of the polyelectrolyte 23, the solvent composition of the catalyst ink, the dispersion strength when controlling the catalyst ink, and the like. For example, as the mixing ratio of the fibrous material 24 is increased, the pore size D corresponding to the peak of the distribution curve is increased accordingly, and as the mixing ratio of the polyelectrolyte 23 is decreased, the pore volume is increased accordingly.

Examples

Figure 12:
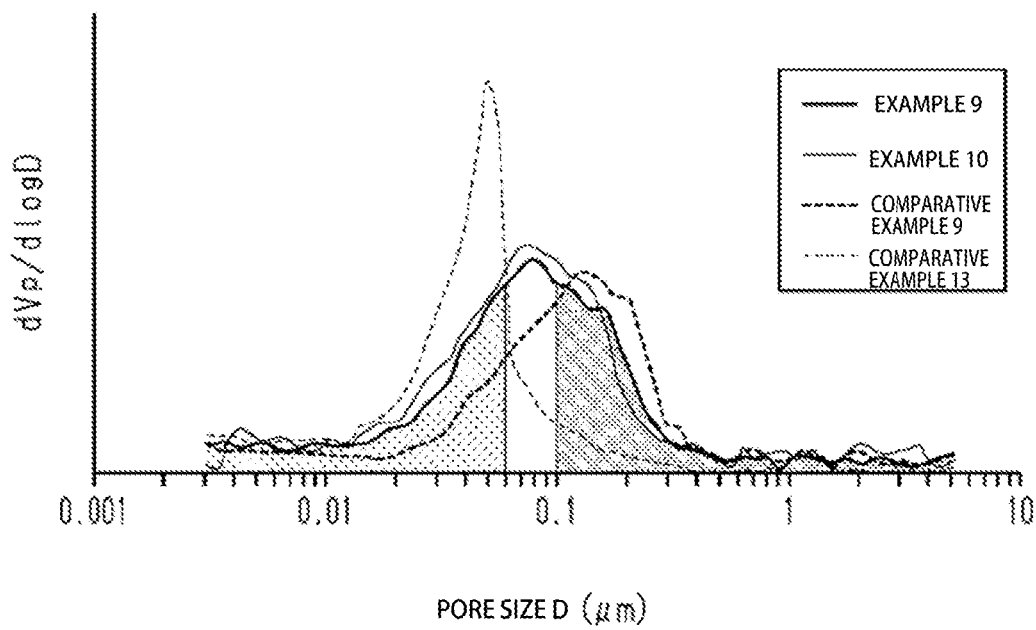
FIG. 12 is a graph illustrating distribution curves for pore size according to examples and comparative examples.
Figure 13:
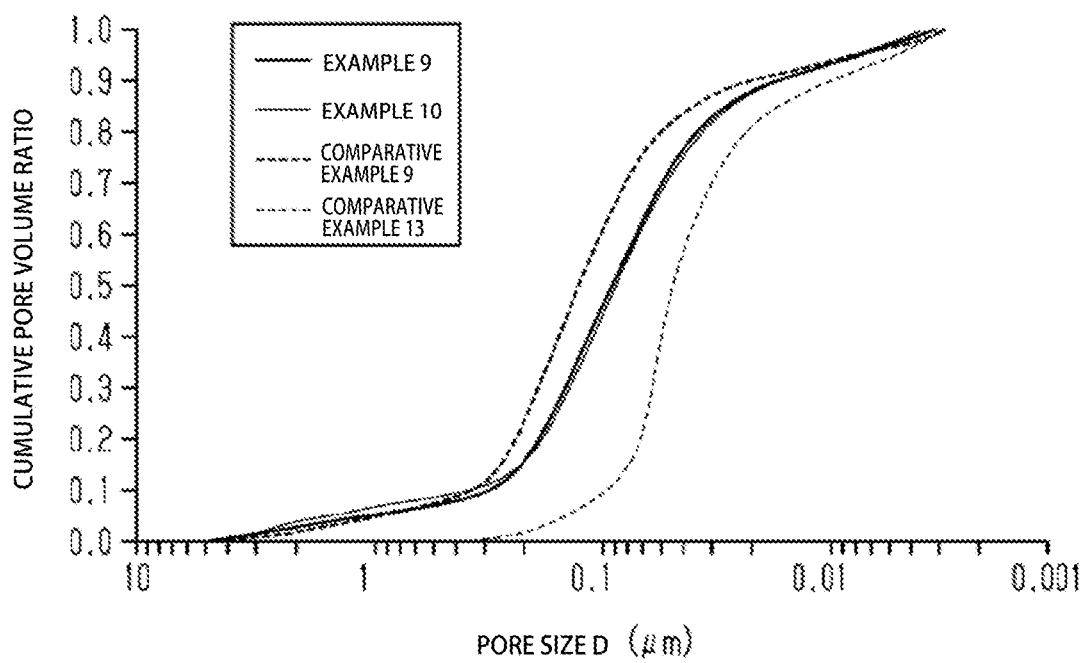
FIG. 13 is a graph illustrating relationships between pore size and cumulative pore volume ratio according to examples and comparative examples.

Referring to FIGS. 12 and 13, and Table 3, examples of the membrane electrode assembly will be described.

Example 9

Platinum on carbon catalyst (TEC10E50E manufactured by Tanaka Kikinzoku Kogyo Co., Ltd.), water, 1-propanol, polyelectrolyte (Nafion (trademark) dispersion manufactured by Wako Pure Chemical Industries, Ltd.), and carbon nanofibers (VGCF (trademark)-H manufactured by Showa Denko K.K.) were mixed. In the platinum on carbon catalyst, a platinum catalyst is supported on carbon particles. The mixture was then subjected to dispersion processing using a planetary ball mill at 300 rpm for 60 minutes. In this case, zirconia balls having a diameter of 5 mm were added to about one third of the zirconia container. A catalyst ink for the oxygen electrode was prepared so that the mass of the polyelectrolyte was 100 mass % relative to the mass of the carbon particles, the mass of the carbon nanofibers was 100 mass % relative to the mass of the carbon particles, the proportion of water in the dispersion medium was 50 mass %, and the solid content was 10 mass %. A catalyst ink for the fuel electrode was prepared using the same method as that used for the catalyst ink for the oxygen electrode, except that the mass of the carbon nanofibers was 150 mass % relative the mass of carbon particles.

The catalyst ink for the oxygen electrode was applied to one surface of a polyelectrolyte membrane (Nafion (trademark) 211 manufactured by Dupont) by using a slit die coater to form a coating film having a thickness of 150 µm. The polyelectrolyte membrane provided with the coating film on one surface was then placed in a hot air oven heated to 80° C. and dried until the tackiness of the coating film disappeared to form an oxygen-electrode-side electrocatalyst layer. Next, the catalyst ink for the fuel electrode was applied to the other surface of the polyelectrolyte membrane by using a slit die coater to form a coating film having a thickness of 50 µm. The polyelectrolyte membrane provided with the coating film on the other surface was then placed in a hot air oven heated to 80° C. and dried until the tackiness of the coating film disappeared to form a fuel-electrode-side electrocatalyst layer. In this way, a membrane electrode assembly of Example 9 was obtained.

Example 10

A membrane electrode assembly of Example 10 was obtained as in Example 9, except that multiwall carbon nanotubes (60 nm to 100 nm in diameter manufactured by Tokyo Chemical Industry Co., Ltd.) were used in place of carbon nanofibers (VGCF (trademark)-H manufactured by Showa Denko K.K.) when preparing the catalyst ink.

Example 11

A membrane electrode assembly of Example 11 was obtained as in Example 9, except that the amount of carbon nanofibers was ½ of that of Example 9 when preparing the catalyst ink for the oxygen electrode.

Example 12

A membrane electrode assembly of Example 12 was obtained as in Example 9, except that the amount of carbon nanofibers was ⅕ of that of Example 9 when preparing the catalyst ink for the oxygen electrode.

Example 13

A membrane electrode assembly of Example 13 was obtained as in Example 9, except that the amount of polyelectrolyte was ½ of that of Example 9 when preparing the catalyst ink for the oxygen electrode.

Example 14

Catalyst inks were prepared as in Example 9. The catalyst ink for the oxygen electrode was applied to a surface of a PTFE film by using a slit die coater to form a coating film having a thickness of 150 µm. The PTFE film provided with the coating film was then placed in a hot air oven heated to 80° C. and dried until the tackiness of the coating film disappeared to form a transfer substrate having an oxygen-electrode-side electrocatalyst layer. The catalyst ink for the fuel electrode was applied to a surface of another PTFE film by using a slit die coater to form a coating film having a thickness of 50 µm. The PTFE film provided with the coating film was then placed in a hot air oven heated to 80°

C. and dried until the tackiness of the coating film disappeared to form a transfer substrate having a fuel-electrode-side electrocatalyst layer.

The transfer substrate having an oxygen-electrode-side electrocatalyst layer was placed on one surface of a polyelectrolyte membrane (Nafion (trademark) 211 manufactured by Dupont), and the transfer substrate having a fuel-electrode-side electrocatalyst layer was placed on the other surface of the polyelectrolyte membrane to form a laminate. The laminate was hot-pressed at a temperature of 120° C. and a pressure of 1 MPa. In this way, the two electrocatalyst layers were bonded to the polyelectrolyte membrane. Then, the PTFE films were removed from the respective electrocatalyst layers to obtain a membrane electrode assembly of Example 14.

Comparative Example 9

A membrane electrode assembly of Comparative Example 9 was obtained as in Example 9, except that the amount of carbon nanofibers was 2 times of that of Example 9 when preparing the catalyst ink for the oxygen electrode.

Comparative Example 10

A membrane electrode assembly of Comparative Example 10 was obtained as in Example 9, except that the amount of polyelectrolyte was 2 times of that of Example 9 when preparing the catalyst ink for the oxygen electrode.

Comparative Example 11

A membrane electrode assembly of Comparative Example 11 was obtained as in Example 9, except that carbon nanotubes (NC7000 manufactured by Nanocyl SA) were used in place of carbon nanofibers (VGCF (trademark)-H manufactured by Showa Denko K.K.) when preparing the catalyst ink for the oxygen electrode.

Comparative Example 12

A membrane electrode assembly of Comparative Example 12 was obtained as in Example 12, except that the amount of carbon nanofibers was 2 times of that of Example 12 when preparing the catalyst ink for the fuel electrode.

Comparative Example 13

A membrane electrode assembly of Comparative Example 13 was obtained as in Example 9, except that no carbon nanofibers were added when preparing individual catalyst inks.

[Calculation Based on Pore Volume Vp]

Distribution of the pore volume Vp was measured by mercury intrusion porosimetry. Specifically, a membrane electrode assembly having a size of about 25 cm$^2$ was prepared, and the pore volume Vp was measured by using an automated porosimeter (Autopore IV9510 manufactured by Micromeritix). The measured cell had a volume of approximately 5 cm$^3$, and the pressure of mercury injection was increased stepwise from 3 kPa to 400 MPa. In this way, the injection amount of mercury, or pore volume Vp, at each pressure was obtained. The pressure of mercury injection was converted to a pore size D by using Washburn's equation, and a pore volume Vp with respect to the pore size D was plotted as a distribution function dVp/d log D (log differential pore volume distribution). The surface tension γ was taken to be 0.48 N/m, and the contact angle θ was taken to be 130°. The pore size D corresponding to the peak of the plot was read out as a pore size Dp.

For the distribution curve of the log differential pore volume distribution, the volumes of all the pores having a pore size in the range of 3 nm or more and 5.5 μm or less, were integrated to calculate a first log differential integrated volume. For the distribution curve, a second log differential integrated volume was calculated by integrating the volumes of the pores having a pore size D of 60 nm or less, and a third log differential integrated volume was calculated by integrating the volumes of the pores having a pore size D of 100 nm or more. The second log differential integrated volume was divided by the first log differential integrated volume, and the quotient was multiplied by 100 to calculate a percentage (%) of the second log differential integrated volume to the first log differential integrated volume. The third log differential integrated volume was divided by the first log differential integrated volume, and the quotient was multiplied by 100 to calculate a percentage (%) of the third log differential integrated volume to the first log differential integrated volume. The second log differential integrated volume was divided by the third log differential integrated volume, and the quotient was multiplied by 100 to calculate a percentage (%) of the second log differential integrated volume to the third log differential integrated volume.

The volumes of all the pores having a pore size D in the range of 3 nm or more and 5.5 μm or less, were integrated to calculate a first integrated volume. A second integrated volume was calculated by integrating the volumes of the pores having a pore volume of 50 nm or less, and a third integrated volume was calculated by integrating the volumes of the pores having a pore volume of 100 nm or more. The second integrated volume was divided by the first integrated volume, and the quotient was multiplied by 100 to calculate a percentage (%) of the second integrated volume to the first integrated volume. The third integrated volume was divided by the first integrated volume, and the quotient was multiplied by 100 to calculate a percentage (%) of the third integrated volume to the first integrated volume.

The volumes of all the pores having a pore size D in the range of 3 nm or more and 5.5 μm or less, were integrated to calculate an integrated pore volume V. The area and thickness of the membrane electrode assembly subjected to measurements by use of the automated porosimeter were multiplied together to calculate a geometric volume of the membrane electrode assembly. Furthermore, the area of the membrane electrode assembly subjected to measurements by use of the automated porosimeter and the thickness of the polyelectrolyte membrane were multiplied together to calculate a volume of the polyelectrolyte membrane. The volume of the polyelectrolyte membrane was subtracted from the volume of the membrane electrode assembly to calculate a geometric volume $V_0$ of the electrocatalyst layers. Then, a percentage of the integrated pore volume V to the geometric volume $V_0$ of the electrocatalyst layers ($V/V_0$) was calculated.

[Measurements of Thickness of Electrocatalyst Layer]

A cross section of the membrane electrode assembly was observed using a scanning electron microscope (SEM) to measure the thicknesses of the membrane electrode assembly, the cathode-side electrocatalyst layer, the anode-side electrocatalyst layer, and the polyelectrolyte membrane. Specifically, a cross section of the membrane electrode assembly was observed at 1,000 times magnification by using a scanning electron microscope (FE-SEM S-4800 manufactured by Hitachi High-Technologies, Ltd., currently Hitachi High-Tech Corporation). The thicknesses of the electrocatalyst layers were measured at 30 observation points of the cross section. The average thickness at the 30 observation points was defined to be the thickness of each layer.

[Measurements of Power Generation Performance]

Power generation performance was measured by using a method according to a booklet titled "Cell unit evaluation and analysis protocol" and published by the New Energy and Industrial Technology Development Organization (NEDO). A JARI standard cell was used as a cell unit for evaluation. In the JARI standard cell, a gas diffusion layer, a gasket, and a separator were disposed on each surface of a membrane electrode assembly and pressed against the surface to achieve a predetermined surface pressure. Then, IV measurements were performed according to the method described in the booklet "Cell unit evaluation and analysis protocol". These conditions were defined to be standard conditions. Also, IV measurements were performed with the relative humidities of the anode and cathode both being set to RH 100%. These conditions were defined to be high humidity conditions.

[Measurements of Durability]

For measuring durability, the same cell unit as in the measurements of power generation performance was used as or more at a voltage of 0.6 V were evaluated as good, and cell units having a current of less than 25 A at a voltage of 0.6 V were evaluated as poor. Under the high humidity conditions, cell units having a current of 30 A or more at a voltage of 0.6V were evaluated as good, and cell units having a current of less than 30 A at a voltage of 0.6 V were evaluated as poor. For durability, cell units having a hydrogen cross leak current of less than 10 times of the initial value after the lapse of 10,000 cycles were evaluated as good, and cell units having a hydrogen cross leak current of 10 times or more of the initial value after the lapse of 10,000 cycles were evaluated as poor.

FIG. 12 shows distribution curves of the pore volume Vp, for membrane electrode assemblies of Examples 9 and 10 and Comparative Examples 9 and 13. In the distribution curve of Example 9 shown in FIG. 12, for illustrative convenience, the region defining a range of the pore size being 60 nm or less is indicated by first dots, and the region defining a range of the pore size being 100 nm or more is indicated by second dots. FIG. 13 shows a graph indicating relationships between cumulative pore volume ratio and pore size D, for membrane electrode assemblies of Examples 9 and 10 and Comparative Examples 9 and 13.

TABLE 3

|  | DP (μm) | V/V$_0$ (%) | T (μm) | Power generation performance | | Durability |
|---|---|---|---|---|---|---|
|  |  |  |  | Standard conditions | High humidity conditions |  |
| Example 9 | 0.093 | 75 | 25 | Good | Good | Good |
| Example 10 | 0.093 | 72 | 25 | Good | Good | Good |
| Example 11 | 0.074 | 70 | 23 | Good | Good | Good |
| Example 12 | 0.066 | 68 | 22 | Good | Good | Good |
| Example 13 | 0.101 | 76 | 22 | Good | Good | Good |
| Comparative Example 14 | 0.090 | 75 | 20 | Good | Good | Good |
| Comparative Example 9 | 0.126 | 62 | 34 | Poor | Poor | Good |
| Comparative Example 10 | 0.058 | 56 | 28 | Poor | Poor | Poor |
| Comparative Example 11 | 0.055 | 60 | 21 | Good | Poor | Good |
| Comparative Example 12 | 0.055 | 70 | 17 | Good | Poor | Poor |
| Comparative Example 13 | 0.053 | 72 | 15 | Good | Poor | Poor | a cell unit for evaluation. Durability was measured by conducting the humidity cycle test described in the booklet "Cell unit evaluation and analysis protocol" mentioned above.

[Comparisons]

Table 1 shows results on the following items for the membrane electrode assemblies of Examples 9 to 14 and Comparative Examples 9 to 13. Table 3 shows pore size Dp at the peak of the distribution curve of the pore volume Vp, percentage V/V$_0$ (%) of integrated pore volume V to volume V$_0$ of the electrocatalyst layers of the membrane electrode assembly, and thickness T (μm) of the electrocatalyst layer, for the individual membrane electrode assemblies.

Also, Table 3 shows measurements of power generation performance and durability on the polymer electrolyte fuel cells respectively including membrane electrode assemblies of Examples 9 to 14 and Comparative Examples 9 to 13.

For the results of power generation performance under the standard conditions, the cell units having a current of 25 A As shown in Table 3, in all of Examples 9 to 14, the pore size Dp at the peak of the distribution curve of the pore volume Vp was in the range of 0.06 μm or more and 0.1 μm or less. In all of Examples 9 to 14, the percentage V/V$_0$ of the integrated pore volume V to the geometric volume V$_0$ of the electrocatalyst layers of the membrane electrode assembly was in the range of 60% or more and 80% or less.

In Examples 9 and 10, the full widths at half maximum were 0.164 μm and 0.146 μm, respectively. In Example 9, the percentage of the second integrated volume to the first integrated volume was 33%, and the percentage of the third integrated volume to the first integrated volume was 42%. In Example 10, the percentage of the second integrated volume to the first integrated volume was 35%, and the percentage of the third integrated volume to the first integrated volume was 40%.

In Example 9, the first, second and third log differential integrated volumes were respectively 15.8, 6.0 and 5.9. Specifically, in Example 9, the percentage of the second log differential integrated volume to the first log differential integrated volume was 37.7%, and the percentage of the third log differential integrated volume to the first log differential integrated volume was 37.3%. In Example 9, the ratio of the second log differential integrated volume to the third log differential integrated volume was 1.0.

In Example 10, the first, second and third log differential integrated volumes were respectively 16.9, 6.6 and 6.0. Specifically, in Example 10, the percentage of the third log differential integrated volume to the first log differential integrated volume was 39.1%, and the percentage of the third log differential integrated volume to the first log differential integrated volume was 35.4%. In Example 10, the ratio of the second log differential integrated volume to the third log differential integrated volume was 1.1.

In all of Examples 9 to 14, power generation performance was evaluated as good and durability was also evaluated as good, regardless of the measurement conditions. Specifically, the membrane electrode assemblies of Examples 9 to 14 were capable of forming a polymer electrolyte fuel cell having good power generation performance and good durability.

In all of Comparative Examples 9 to 13, the pore size Dp at the peak of the distribution curve of the pore volume Vp was outside the range of 0.06 µm or more and 0.11 µm or less. In Comparative Example 10, the percentage $V/V_0$ of the integrated pore volume V to the geometric volume $V_0$ of the electrocatalyst layers of the membrane electrode assembly was outside the range of 60% or more and 80% or less.

In Comparative Examples 1 and 13, the full widths at half maximum were 0.026 µm and 0.196, respectively. In Comparative Example 9, the percentage of the second integrated volume to the first integrated volume was 22%, and the percentage of the third integrated volume to the first integrated volume was 57%. In Comparative Example 13, the percentage of the second integrated volume to the first integrated volume was 70%, and the percentage of the third integrated volume to the first integrated volume was 8%.

In Comparative Example 9, the first, second and third log differential integrated volumes were respectively 17.3, 4.9 and 9.8. Specifically, in Comparative Example 9, the percentage of the second log differential integrated volume to the first log differential integrated volume was 26.7%, and the percentage of the third log differential integrated volume to the first log differential integrated volume was 56.9%. In Comparative Example 9, the ratio of the second log differential integrated volume to the third log differential integrated volume was 0.5.

In Comparative Example 13, the first, second and third log differential integrated volumes were respectively 13.1, 10.9 and 0.9. Specifically, the percentage of the third log differential integrated volume to the first log differential integrated volume was 81.1%, and the percentage of the third log differential integrated volume to the first log differential integrated volume was 6.8%. In Comparative Example 13, the ratio of the second log differential integrated volume to the third log differential integrated volume was 11.8.

In Comparative Examples 9 to 13, power generation performance was evaluated to be poor under the standard conditions and/or high humidity conditions. In Comparative Examples 10, 12 and 13, durability was also evaluated to be poor. Thus, according to Comparative Examples 9 to 13, power generation performance and/or durability were impaired, compared to the above examples.

As described above, according to the membrane electrode assembly and the fuel cell of the third embodiment, the advantageous effects enumerated below can be obtained.

(10) Since the pore size D is in the range of 0.06 µm or more and 0.11 µm or less, at the peak of the distribution curve indicating distribution of the pore volume Vp with respect to the pore size D, the electrocatalyst layer 12 contains voids for achieving sufficient gas diffusion and drainage. In this way, power generation performance of the polymer electrolyte fuel cell 30 including the membrane electrode assembly 10 can be enhanced.

(11) When the full width at half maximum of the distribution curve is in the range of 0.13 µm or more and 0.18 µm or less, the distribution range of the pore size D can be an appropriate range.

(12) When the percentage of the second integrated volume to the first indicated volume is in the range of 25% or more and 45% or less, the pores can include those pores which have a relatively small size in the above range, so that the three-phase interface can be maintained in the electrocatalyst layers 12, and gas diffusion and drainage of the produced water can be enhanced in the electrocatalyst layers 12.

(13) When the percentage of the third integrated volume to the first integrated volume is in the range of 30% or more and 50% or less, the pores can include those pores which have relatively large sizes in the above range, so that the three-phase interface can be maintained in the electrocatalyst layers 12, and gas diffusion and drainage of the produced water can be enhanced in the electrocatalyst layers 12.

(14) When the percentage of the second log differential integrated volume to the first log differential integrated volume and the percentage of the third log differential integrated volume to the first log differential integrated volume are both in the range of 30% or more and 60% or less, the pores can include those pores which have relatively large sizes and relatively small sizes in this range. In this way, the three-phase interface can be maintained in the electrocatalyst layers 12, and gas diffusion and drainage of the produced water can be enhanced in the electrocatalyst layers 12.

(15) When the ratio of the second log-differential integrated volume to the third log-differential integrated volume is in the range of 0.7 or more and 1.5 or less, the ratio of the relatively small pores to the relatively large pores can be in a range which is suitable for maintaining the three-phase interface and enhancing gas diffusion and drainage of the produced water. This may further enhance power generation performance of the polymer electrolyte fuel cell 30 to which the membrane electrode assembly 10 is applied.

(16) When the percentage $V/V_0$ of the integrated pore volume to the geometric volume $V_0$ of the electrocatalyst layers 12 of the membrane electrode assembly 10 is in the range of 60% or more and 80% or less, the three-phase interface can be maintained, and gas diffusion and drainage of the produced water can be enhanced in the electrocatalyst layers 12. In this way, power generation performance of the polymer electrolyte fuel cell 30 including the membrane electrode assembly 10 can be enhanced.

[Modification of Third Embodiment]

The membrane electrode assembly 10 of the third embodiment can be combined with the configuration of the electrocatalyst layers 12 of the first embodiment and/or the configuration of the electrocatalyst layers 12 of the second embodiment. That is, the electrocatalyst layers 12 of the third embodiment may be configured to satisfy at least one of Conditions 1 to 6 in addition to at least one of Conditions 7, 9, 10 and 11 described above.

What is claimed is:

1. A membrane electrode assembly used for a polymer electrolyte fuel cell, comprising:
    a polyelectrolyte membrane having a first surface and a second surface facing away from the first surface;
    a fuel-electrode-side electrocatalyst layer bonded to the first surface and containing a first catalytic material, a first electrically conductive carrier, and a first polyelectrolyte, the first electrically conductive carrier carrying the first catalytic material; and
    an oxygen-electrode-side electrocatalyst layer bonded to the second surface and containing a second catalytic material, a second electrically conductive carrier, a second polyelectrolyte, and a fibrous material, the second electrically conductive carrier carrying the second catalytic material, wherein,
    the membrane electrode assembly contains voids, the voids including pores each having a size in a range of 3 nm or more and 5.5 µm or less; and
    a distribution curve indicating distribution of pore volume with respect to pore size has a peak at which the pore size is in a range of 0.06 µm or more and 0.11 µm or less, the pore volume being a sum of volumes of pores having a specific pore size among the pores and being measured by mercury intrusion porosimetry, the pore size being a diameter of a pore calculated from the pore volume, wherein,
    at least one of the fuel-electrode-side electrocatalyst layer and the oxygen-electrode-side electrocatalyst layer is an electrocatalyst layer; and
    when a void having a diameter in a range of 3 nm or more and 5.5 µm or less, among voids in the electrocatalyst layer is defined to be a pore,
    a diameter of the pore calculated from a pore volume measured by mercury intrusion porosimetry is a pore size,
    an integrated value of the pore volumes of all the pores is a first integrated volume
    an integrated value of the pore volumes of the pores having a pore size of 50 nm or less is a second integrated volume, and
    a percentage of the second integrated volume to the first integrated volume is in a range of 30% or more and 40% or less.

2. The membrane electrode assembly of claim 1, wherein a full width at half maximum of the distribution curve is in a range of 0.13 µm or more and 0.18 µm or less.

3. The membrane electrode assembly of claim 1, wherein a percentage of an integrated pore volume to a geometric volume is in a range of 60% or more and 80% or less, the integrated pore volume being obtained by integrating the pore volumes of the pores having pore sizes in the range of the pore size, the geometric volume being obtained by subtracting a geometric volume of the polyelectrolyte membrane from a geometric volume of the membrane electrode assembly.

4. The membrane electrode assembly of claim 1, wherein, the pore size at a peak of a distribution curve indicating distribution of pore volume with respect to pore size is in a range of 0.06 µm or more and 0.1 µm or less.

5. The membrane electrode assembly of claim 1, wherein, an integrated value of the pore volumes of the pores having a pore size of 90 nm or more is a third integrated volume, and
    a percentage of the third integrated volume to the first integrated volume is in a range of 15% or more and 35% or less.

6. The membrane electrode assembly of claim 1, wherein,
    a pore size in a range of 50 nm or more and 80 nm or less is a first pore size range,
    an integrated value of the pore volumes of the pores having a size between 3 nm and the first pore size range is a cumulative pore volume, a percentage of the cumulative pore volume to the first integrated volume being a cumulative pore volume ratio, and
    a gradient of a distribution curve indicating distribution of cumulative pore volume with respect to first pore size (µm) range is in a range of 7 or more and 14 or less.

7. The membrane electrode assembly of claim 4, wherein a percentage of an integrated volume to a volume of the electrocatalyst layer is in a range of 65% or more and 90% or less, the integrated volume being obtained by integrating the pore volumes of all the pores.

8. The membrane electrode assembly of claim 1, wherein,
    in a distribution of pore volume with respect to pore size obtained through mercury intrusion porosimetry, with the pore volumes being normalized such that a minimum value of the pore volumes is 0 and a maximum value of the pore volumes is 1,
    a pore size when the pore volume has a maximum value is a maximum-volume size, and
    there is a shoulder peak point at which the pore size is smaller than the maximum-volume size and the pore volume is 0.2 or more.

9. The membrane electrode assembly of claim 8, wherein the distribution has the shoulder peak point at which the pore volume is in a range of 0.3 or more and 0.8 or less.

10. The membrane electrode assembly of claim 8, wherein a specific pore size at the shoulder peak point is in a range of 0.03 µm or more and 0.06 µm or less.

11. The membrane electrode assembly of claim 8, wherein a difference between the specific pore size at the shoulder peak point and the maximum-volume size is in a range of 0.02 µm or more and 0.07 µm or less.

12. The membrane electrode assembly of claim 8, wherein a difference between a pore volume for the specific pore size at the shoulder peak point of an approximated curve, and a pore volume at the shoulder peak point is 0.03 or more, the approximated curve being obtained by approximating a peak corresponding to the maximum value by a Gaussian function.

13. The membrane electrode assembly pf claim 1, wherein,
    the fibrous material contains one or more fibrous materials selected from electron-conducting fibers and proton-conducting fibers; and
    the electron-conducting fibers include at least one selected from the group consisting of carbon nanofibers, carbon nanotubes, and transition metal-containing fibers.

14. The membrane electrode assembly of claim 1, wherein,
    the fibrous material is a second fibrous material;
    the fuel-electrode-side electrocatalyst layer contains a first fibrous material; and
    a mass of the first fibrous material per unit volume is larger than a mass of the second fibrous material per unit volume.

15. The membrane electrode assembly of claim 1, wherein the oxygen-electrode-side electrocatalyst layer has a thickness in a range of 5 µm or more and 30 µm or less.

16. The membrane electrode assembly of claim 1, wherein the fuel-electrode-side electrocatalyst layer has a thickness in a range of 5 µm or more and 20 µm or less.

17. A polymer electrolyte fuel cell, comprising the membrane electrode assembly of claim 1.

18. A membrane electrode assembly used for a polymer electrolyte fuel cell, comprising:
- a polyelectrolyte membrane having a first surface and a second surface facing away from the first surface;
- a fuel-electrode-side electrocatalyst layer bonded to the first surface and containing a first catalytic material, a first electrically conductive carrier, and a first polyelectrolyte, the first electrically conductive carrier carrying the first catalytic material; and
- an oxygen-electrode-side electrocatalyst layer bonded to the second surface and containing a second catalytic material, a second electrically conductive carrier, a second polyelectrolyte, and a fibrous material, the second electrically conductive carrier carrying the second catalytic material, wherein,
- the membrane electrode assembly contains voids, the voids including pores each having a size in a range of 3 nm or more and 5.5 µm or less; and
- a distribution curve indicating distribution of pore volume with respect to pore size has a peak at which the pore size is in a range of 0.06 µm or more and 0.11 µm or less, the pore volume being a sum of volumes of pores having a specific pore size among the pores and being measured by mercury intrusion porosimetry, the pore size being a diameter of a pore calculated from the pore volume, wherein,
- at least one of the fuel-electrode-side electrocatalyst layer and the oxygen-electrode-side electrocatalyst layer is an electrocatalyst layer; and
- when a void having a diameter in a range of 3 nm or more and 5.5 µm or less, among voids in the electrocatalyst layer is defined to be a pore,
- a diameter of the pore calculated from a pore volume measured by mercury intrusion porosimetry is a pore size,
- an integrated value of the pore volumes of all the pores is a first integrated volume,
- an integrated value of the pore volumes of the pores having a pore size of 90 nm or more is a third integrated volume, and
- a percentage of the third integrated volume to the first integrated volume is in a range of 15% or more and 35% or less.

19. A membrane electrode assembly used for a polymer electrolyte fuel cell, comprising:
- a polyelectrolyte membrane having a first surface and a second surface facing away from the first surface;
- a fuel-electrode-side electrocatalyst layer bonded to the first surface and containing a first catalytic material, a first electrically conductive carrier, and a first polyelectrolyte, the first electrically conductive carrier carrying the first catalytic material; and
- an oxygen-electrode-side electrocatalyst layer bonded to the second surface and containing a second catalytic material, a second electrically conductive carrier, a second polyelectrolyte, and a fibrous material, the second electrically conductive carrier carrying the second catalytic material, wherein,
- the membrane electrode assembly contains voids, the voids including pores each having a size in a range of 3 nm or more and 5.5 µm or less; and
- a distribution curve indicating distribution of pore volume with respect to pore size has a peak at which the pore size is in a range of 0.06 µm or more and 0.11 µm or less, the pore volume being a sum of volumes of pores having a specific pore size among the pores and being measured by mercury intrusion porosimetry, the pore size being a diameter of a pore calculated from the pore volume, wherein,
- at least one of the fuel-electrode-side electrocatalyst layer and the oxygen-electrode-side electrocatalyst layer is an electrocatalyst layer; and
- when a void having a diameter in a range of 3 nm or more and 5.5 µm or less, among voids in the electrocatalyst layer is defined to be a pore,
- a diameter of the pore calculated from a pore volume measured by mercury intrusion porosimetry is a pore size,
- an integrated value of the pore volumes of all the pores is a first integrated volume,
- a pore size in a range of 50 nm or more and 80 nm or less is a first pore size range,
- an integrated value of the pore volumes of the pores having a size between 3 nm and the first pore size range is a cumulative pore volume, a percentage of the cumulative pore volume to the first integrated volume being a cumulative pore volume ratio, and
- a gradient of a distribution curve indicating distribution of cumulative pore volume with respect to first pore size (µm) range is in a range of 7 or more and 14 or less.

20. A membrane electrode assembly used for a polymer electrolyte fuel cell, comprising:
- a polyelectrolyte membrane having a first surface and a second surface facing away from the first surface;
- a fuel-electrode-side electrocatalyst layer bonded to the first surface and containing a first catalytic material, a first electrically conductive carrier, and a first polyelectrolyte, the first electrically conductive carrier carrying the first catalytic material; and
- an oxygen-electrode-side electrocatalyst layer bonded to the second surface and containing a second catalytic material, a second electrically conductive carrier, a second polyelectrolyte, and a fibrous material, the second electrically conductive carrier carrying the second catalytic material, wherein,
- the membrane electrode assembly contains voids, the voids including pores each having a size in a range of 3 nm or more and 5.5 um or less; and
- a distribution curve indicating distribution of pore volume with respect to pore size has a peak at which the pore size is in a range of 0.06 µm or more and 0.11 µm or less, the pore volume being a sum of volumes of pores having a specific pore size among the pores and being measured by mercury intrusion porosimetry, the pore size being a diameter of a pore calculated from the pore volume, wherein,
- at least one of the fuel-electrode-side electrocatalyst layer and the oxygen-electrode-side electrocatalyst layer is an electrocatalyst layer;
- a void having a diameter in a range of 3 nm or more and 5.5 µm or less, among voids in the electrocatalyst layer is defined to be a pore; and
- in a distribution of pore volume with respect to pore size obtained through mercury intrusion porosimetry, with the pore volumes being normalized such that a minimum value of the pore volumes is 0 and a maximum value of the pore volumes is 1, a pore size when the pore volume has a maximum value is a maximum-volume size, and there is a shoulder peak point at which the pore size is smaller than the maximum-volume size and the pore volume is 0.2 or more.

\* \* \* \* \*